US008200549B1

(12) United States Patent
Crean et al.

(10) Patent No.: US 8,200,549 B1
(45) Date of Patent: Jun. 12, 2012

(54) TRIP COMPARISON SYSTEM

(75) Inventors: Hugh Crean, Seattle, WA (US); David Pelter, Seattle, WA (US)

(73) Assignee: Farecast, Inc., Seattle, WA (US)

( * ) Notice: Subject to any disclaimer, the term of this patent is extended or adjusted under 35 U.S.C. 154(b) by 100 days.

(21) Appl. No.: 12/253,195

(22) Filed: Oct. 16, 2008

Related U.S. Application Data

(63) Continuation of application No. 12/037,775, filed on Feb. 26, 2008, now abandoned, which is a continuation of application No. 11/675,499, filed on Feb. 15, 2007.

(60) Provisional application No. 60/774,967, filed on Feb. 17, 2006.

(51) Int. Cl.
*G06Q 30/00* (2006.01)

(52) U.S. Cl. .................................. 705/26.64

(58) Field of Classification Search ............... 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | |
|---|---|---|---|
| 4,837,744 A | 6/1989 | Marquot | |
| 4,922,439 A | 5/1990 | Greenblatt | |
| 5,021,693 A | 6/1991 | Shima | |
| 5,237,499 A * | 8/1993 | Garback | 705/5 |
| 5,255,184 A | 10/1993 | Hornick et al. | |
| 5,270,921 A | 12/1993 | Hornick | |
| 5,289,401 A | 2/1994 | Shima | |
| 5,704,017 A | 12/1997 | Heckerman et al. | |
| 5,732,398 A * | 3/1998 | Tagawa | 705/5 |
| 5,794,207 A | 8/1998 | Walker et al. | |
| 5,797,127 A | 8/1998 | Walker et al. | |
| 5,832,452 A | 11/1998 | Schneider et al. | |
| 5,864,818 A | 1/1999 | Feldman | |
| 5,875,126 A | 2/1999 | Minch et al. | |
| 5,897,620 A | 4/1999 | Walker et al. | |
| 5,918,209 A | 6/1999 | Campbell et al. | |
| 5,933,039 A | 8/1999 | Hui et al. | |
| 6,041,308 A | 3/2000 | Walker et al. | |
| 6,076,070 A | 6/2000 | Stack | |
| 6,085,164 A | 7/2000 | Smith et al. | |

(Continued)

FOREIGN PATENT DOCUMENTS

EP 1148433 10/2001

(Continued)

OTHER PUBLICATIONS

U.S. Appl. No. 11/928,725, Etzioni et al.

(Continued)

*Primary Examiner* — Naeem Haq
(74) *Attorney, Agent, or Firm* — Perkins Coie LLP

(57) ABSTRACT

A method and system is provided for making price-related predictions of items based on training a classifier using historical information including pricing information for the items and labels relating to the price-related information that are generated automatically from the historical information. A prediction system provides price-related predictions for airline tickets. The prediction system collects flight information for flights on a daily basis. The prediction system generates training data to train a classifier to make the price-related predictions using the flight information. After training the classifier, the prediction system then can make the price-related predictions for a trip.

16 Claims, 20 Drawing Sheets

U.S. PATENT DOCUMENTS

| | | | |
|---|---|---|---|
| 6,085,169 | A | 7/2000 | Walker et al. |
| 6,092,017 | A | 7/2000 | Ishida et al. |
| 6,108,639 | A | 8/2000 | Walker et al. |
| 6,112,185 | A * | 8/2000 | Walker et al. ............ 705/5 |
| 6,134,534 | A | 10/2000 | Walker et al. |
| 6,167,383 | A * | 12/2000 | Henson ............ 705/26 |
| 6,240,396 | B1 | 5/2001 | Walker et al. |
| 6,263,323 | B1 | 7/2001 | Baggett |
| 6,275,808 | B1 | 8/2001 | DeMarcken |
| 6,295,521 | B1 | 9/2001 | DeMarcken et al. |
| 6,307,572 | B1 | 10/2001 | DeMarcken et al. |
| 6,332,129 | B1 | 12/2001 | Walker et al. |
| 6,345,090 | B1 | 2/2002 | Walker et al. |
| 6,356,878 | B1 | 3/2002 | Walker et al. |
| 6,377,932 | B1 | 4/2002 | DeMarcken |
| 6,381,578 | B1 | 4/2002 | DeMarcken |
| 6,418,413 | B2 | 7/2002 | DeMarcken et al. |
| 6,418,415 | B1 | 7/2002 | Walker et al. |
| 6,442,526 | B1 | 8/2002 | Vance et al. |
| 6,484,153 | B1 | 11/2002 | Walker et al. |
| 6,510,418 | B1 | 1/2003 | Case et al. |
| 6,553,346 | B1 | 4/2003 | Walker et al. |
| 6,567,824 | B2 | 5/2003 | Fox |
| 6,609,098 | B1 | 8/2003 | DeMarcken |
| 6,658,422 | B1 | 12/2003 | Levanoni et al. |
| 6,974,079 | B1 | 12/2005 | Strothmann et al. |
| 6,990,457 | B1 | 1/2006 | Litman et al. |
| 7,010,494 | B2 | 3/2006 | Etzioni et al. |
| 7,076,451 | B1 | 7/2006 | Coupland et al. |
| 7,110,960 | B2 | 9/2006 | Phillips et al. |
| 7,133,848 | B2 | 11/2006 | Phillips et al. |
| 7,136,821 | B1 | 11/2006 | Kohavi et al. |
| 7,181,410 | B1 | 2/2007 | Jones et al. |
| 7,209,895 | B2 * | 4/2007 | Kundtz et al. ............ 705/26 |
| 7,263,496 | B1 | 8/2007 | Weigelt et al. |
| 7,263,664 | B1 * | 8/2007 | Daughtrey ............ 715/764 |
| 7,313,539 | B1 | 12/2007 | Pappas et al. |
| 7,333,959 | B2 | 2/2008 | Kawamura et al. |
| 7,346,520 | B2 | 3/2008 | Etzioni et al. |
| 7,394,900 | B1 * | 7/2008 | Gerber et al. ............ 380/259 |
| 7,693,750 | B2 | 4/2010 | Christensen |
| 7,797,187 | B2 | 9/2010 | Crean et al. |
| 2001/0039519 | A1 | 11/2001 | Richards |
| 2002/0002548 | A1 | 1/2002 | Roundtree |
| 2002/0007331 | A1 | 1/2002 | Lo et al. |
| 2002/0082877 | A1 | 6/2002 | Schiff et al. |
| 2002/0099636 | A1 | 7/2002 | Narumo |
| 2002/0111935 | A1 | 8/2002 | Jones et al. |
| 2002/0152101 | A1 | 10/2002 | Lawson et al. |
| 2002/0152111 | A1 | 10/2002 | Cox et al. |
| 2002/0156659 | A1 | 10/2002 | Walker et al. |
| 2002/0156661 | A1 * | 10/2002 | Jones et al. ............ 705/6 |
| 2002/0161689 | A1 | 10/2002 | Segal |
| 2002/0169760 | A1 | 11/2002 | Cheung et al. |
| 2002/0178069 | A1 | 11/2002 | Walker et al. |
| 2002/0184059 | A1 | 12/2002 | Offutt et al. |
| 2003/0004760 | A1 | 1/2003 | Schiff et al. |
| 2003/0033164 | A1 | 2/2003 | Faltings et al. |
| 2003/0036928 | A1 | 2/2003 | Kenigsberg et al. |
| 2003/0040946 | A1 | 2/2003 | Sprenger et al. |
| 2003/0055779 | A1 | 3/2003 | Wolf |
| 2003/0061179 | A1 | 3/2003 | Reece |
| 2003/0061211 | A1 | 3/2003 | Shultz et al. |
| 2003/0069747 | A1 | 4/2003 | Strothmann et al. |
| 2003/0125994 | A1 | 7/2003 | Jaehn et al. |
| 2003/0130899 | A1 | 7/2003 | Ferguson et al. |
| 2003/0154142 | A1 | 8/2003 | Ginsburg et al. |
| 2003/0182052 | A1 | 9/2003 | DeLorme et al. |
| 2003/0187705 | A1 | 10/2003 | Schiff et al. |
| 2003/0187771 | A1 | 10/2003 | Bulan |
| 2003/0187772 | A1 | 10/2003 | Papka |
| 2003/0225608 | A1 | 12/2003 | Wu et al. |
| 2003/0229552 | A1 | 12/2003 | Lebaric et al. |
| 2004/0054634 | A1 | 3/2004 | Tak |
| 2004/0078252 | A1 | 4/2004 | Daughtrey et al. |
| 2004/0098287 | A1 | 5/2004 | Young et al. |
| 2004/0249683 | A1 | 12/2004 | Demarcken et al. |
| 2005/0033616 | A1 | 2/2005 | Vavul et al. |
| 2005/0043974 | A1 * | 2/2005 | Vassilev et al. ............ 705/5 |
| 2005/0044001 | A1 | 2/2005 | Narayanaswami |
| 2005/0086087 | A1 | 4/2005 | Razza et al. |
| 2005/0090911 | A1 | 4/2005 | Ingargiola et al. |
| 2005/0091146 | A1 | 4/2005 | Levinson |
| 2005/0108069 | A1 | 5/2005 | Shiran et al. |
| 2005/0154620 | A1 | 7/2005 | Hentschel et al. |
| 2005/0177402 | A1 | 8/2005 | Walker et al. |
| 2005/0197893 | A1 | 9/2005 | Landau et al. |
| 2005/0216301 | A1 | 9/2005 | Brown |
| 2006/0064333 | A1 | 3/2006 | Razza et al. |
| 2006/0106655 | A1 | 5/2006 | Lettovsky et al. |
| 2006/0116901 | A1 | 6/2006 | Ookubo et al. |
| 2006/0129463 | A1 | 6/2006 | Zicherman |
| 2006/0143159 | A1 | 6/2006 | Chowdhury et al. |
| 2006/0161480 | A1 | 7/2006 | Christensen |
| 2006/0173753 | A1 | 8/2006 | Padmanabhan et al. |
| 2006/0206395 | A1 | 9/2006 | Vallabh |
| 2006/0235768 | A1 | 10/2006 | Tatum et al. |
| 2007/0021991 | A1 | 1/2007 | Etzioni et al. |
| 2007/0038553 | A1 | 2/2007 | Miller et al. |
| 2007/0061174 | A1 | 3/2007 | Phillips |
| 2007/0073562 | A1 | 3/2007 | Brice et al. |
| 2007/0112635 | A1 | 5/2007 | Loncaric |
| 2007/0198306 | A1 | 8/2007 | Crean et al. |
| 2007/0198307 | A1 | 8/2007 | Crean et al. |
| 2007/0198308 | A1 | 8/2007 | Crean et al. |
| 2007/0198309 | A1 | 8/2007 | Crean et al. |
| 2007/0198310 | A1 | 8/2007 | Crean et al. |
| 2007/0226084 | A1 | 9/2007 | Cowles |
| 2008/0046298 | A1 | 2/2008 | Ben-Yehuda et al. |
| 2008/0091726 | A1 | 4/2008 | Koretz et al. |
| 2008/0103842 | A1 | 5/2008 | Johnson |
| 2008/0114622 | A1 | 5/2008 | Crean et al. |
| 2008/0208663 | A1 | 8/2008 | Walker et al. |
| 2008/0228658 | A1 | 9/2008 | Crean et al. |
| 2009/0030746 | A1 | 1/2009 | Etzioni et al. |
| 2009/0063167 | A1 | 3/2009 | Bartot et al. |
| 2010/0250291 | A1 | 9/2010 | Walker et al. |
| 2011/0046989 | A1 | 2/2011 | Crean et al. |
| 2011/0131109 | A1 | 6/2011 | Pappas et al. |
| 2011/0251917 | A1 | 10/2011 | Etzioni et al. |

FOREIGN PATENT DOCUMENTS

| | | |
|---|---|---|
| JP | 2131012 | 5/1990 |
| JP | 5335656 | 12/1993 |
| JP | 2000076335 A | 3/2000 |
| JP | 2002092249 | 3/2002 |
| JP | 2002259779 | 9/2002 |
| JP | 2002358472 | 12/2002 |
| JP | 2003006293 A | 1/2003 |
| JP | 2005275487 A | 10/2005 |
| WO | WO-00057331 A2 | 9/2000 |
| WO | WO-03052550 | 6/2003 |
| WO | WO-03081385 | 10/2003 |

OTHER PUBLICATIONS

U.S. Appl. No. 11/772,523, Etzioni et al.
U.S. Appl. No. 11/675,499, Crean et al.
U.S. Appl. No. 12/037,775, filed Feb. 26, 2008, Crean et al.
Belobaba, P., "Application of a Probabilistic Decision Model to Airline Seat Inventory Control,"Mar.-Apr. 1989; Operations Research ,pp. 183-197 (16 pages).
Chmielewski, D., "San Francisco-Based Firm Develops Technology for Interactive TV," Apr. 19, 2001, KRTBN Knight Ridder Tribune Business News (San Jose Mercury News, California) (2 pages).
Cohen, W., "Fast Effective Rule Induction," Proceedings of the 12th International Conference on Machine Learning, 1995, (10 pages).
Davis et al., "Blur—the speed of change in the connected economy, " Sep./Oct. 2000, British Journal of Administrative Management, n22, pp. 20 (3 pages).
Etzioni, O. et al., "To Buy or Not to Buy: Mining Airfare Data to Minimize Ticket Purchase Price," Proceedings of the Ninth ACM SIGKDD 2003, Aug. 24-27, 2003, Washington, D.C., (10 pages).
Harrill, R., "Airline analyzer could save big bucks by advising when to buy ticket," Apr. 1, 2003, University of Washington; http://www.washington.edu/newsroom/news/2003archive/04-03archive/k040103.html (3 pages).

ITA Software, "Corporate Background," accessed Feb. 9, 2004, (1 page).

Muehlbauer, J., "Orbitz Reaches New Heights, Better technology results in a competitive advantage," CMP Media LLC, Apr. 2002, pp. 1-5 (5 pages).

Rivalwatch.com, 1999-2003, (13 pages).

Robinson, S., "Computer Scientists Find Unexpected Depths in Airfare Search Problem," Society for Industrial and Applied Mathematics, Jul./Aug. 2002, pp. 1-6 (6 pages).

Sutton, R., "Reinforcement Learning: An Introduction," MIT Press, Cambridge, MA, 1998, http://www-anw.cs.umass.edu/~rich/book/the-book.html, accessed May 5, 2004, pp. 1-3 (6 pages).

Ting, K. et al., "Issues in Stacked Generalization," Journal of Artificial Intelligence Research 10 (1999), pp. 271-289 (19 pages).

Bly, L., "Comparison-Shopping Tools Lure Travelers," USA Today, Oct. 17, 2003 (3 pages).

"NexTag Launches ServicesShopping (SM) With Comparison Shopping for Mortgages, Travel Cars, Real Estate and Education," PR Newswire, Oct. 25, 2004 (2 pages).

TravelCLICK, Hotelligence Report, http://web.archive.org/web/20040202113915/http://www.travelclick.net/Tours/HOTEL-LIGENCE/HotelligenceSa_SPDFVERSION.pdf, Feb. 2, 2004 (14 pages).

Tedeschi, B., "Orbitz Offers Options for Flexible Travelers," http://proquest.umi.com/pqdweb?did=334784901&sid=1&Fmt=3&clientId=19649&RQT=309&Vnames=PQD, May 11, 2003 (2 pages).

PCT International Search Report, US06/02136, Applicant: Search Party, Inc., Mailing Date: Aug. 17, 2007, (2 pages).

PCT International Search Report, US2008/074680, Applicant: Farecast, Inc., Mailing Date: Mar. 19, 2009, (3 pages).

PCT International Search Report, US08/56901, Applicant: Farecast, Inc., Mailing Date: Jun. 25, 2008, (3 pages).

PCT International Search Report, US07/62332, Applicant: Farecast Inc., Mailing Date: Sep. 25, 2007, (2 pages).

PCT International Search Report, US04/09498, Applicant: University of Washington, Mailing Date: Aug. 2, 2005, (2 pages).

PCT International Search Report, US07/83882, Applicant: Farecast, Inc., Mailing Date: May 7, 2008, (2 pages).

CastleWorks,lnc. "Daily Schedule," Feb. 5, 2004 , http://web.archive.org/web/20040205032101/http://pbskids.org/itsmylife/school/time/print_pied_daily_schedule.html.

U.S. Appl. No. 13/082,362, filed Apr. 7, 2011, Etzioni et al.

Anon., "Women Outpace Men in Cell Phone Ownership, but Men Are More Fanatic About PDAs," Business Wire, Mar. 1, 2001, 2 pages.

Richtel, M., "Man Emerges, Still Breathing, After E-Cave Confinement," New York Times, Final Edition, p. 33, col. 1, Sep. 22, 1999, 5 pages.

SeatGuru, Domestic Economy Comparison Chart, http://web.archive.org/web/20060901161020/www.seatguru.com/charts/domestic_economy.php, Sep. 1, 2006, 8 pages.

Grossman, David, "Getting a good airplane seat," http://www.usatoday.com/travel/columnist/grossman/2006-11-03-grossman_x.htm, Nov. 3, 2006, USATODAY.com, 2 pages.

Ioannidis, Yannis, "The History of Histograms (abridged)," Proceedings of the 29th VLDB Conference, Berlin, Germany, 2003, 12 pages.

Merriam Webster, "criteria," http://www.merriam-webster.com/dictionary/criteria, Sep. 22, 2010, 2 pages.

SeatGuru, Finding Your Aircraft Type, http://web.archive.org/web/20060316200628/http://seatguru.com/articles/aircraft_type.php, Mar. 16, 2006, 5 pages.

* cited by examiner

TRIP COMPARISON SYSTEM

CROSS REFERENCE TO RELATED APPLICATION

The present application is a continuation of U.S. patent application Ser. No. 12/037,775, filed Feb. 26, 2008, and entitled "TRIP COMPARISON SYSTEM," which application is a continuation of U.S. patent application Ser. No. 11/675,499 filed on Feb. 15, 2007, entitled "TRAVEL-RELATED PREDICTION SYSTEM," which claims the benefit of U.S. Provisional Patent Application No. 60/774,967 filed Feb. 17, 2006, and entitled "FARE FORECASTING SYSTEM (OMNIBUS)," which applications are hereby incorporated by reference in their entireties.

BACKGROUND

In many situations, potential buyers or other acquirers of various types of items (such as products and/or services) are faced with difficult decisions when attempting to determine whether acquiring a particular item of interest under current conditions is desirable or optimal based on their goals, or whether instead delaying the acquisition would be preferable. For example, when the potential acquirer desires to obtain the item at the lowest price possible before some future date, and the item is currently offered by a seller for a current price, the potential acquirer needs to evaluate whether accepting the current price is more advantageous than the potential benefits and costs associated with waiting to see if the item will continue to be available and will be later offered at a lower price before the future date. Such potential acquisitions can include a variety of types of transactions (e.g., fixed-price purchase, auction-based purchase, reverse auction purchase, name-your-price purchase, rent, lease, license, trade, evaluation, sampling, etc.), and can be performed in a variety of ways (e.g., by online shopping using a computing device, such as via the World Wide Web or other computer network).

The difficulty of evaluating a potential current item acquisition is exacerbated in environments in which the prices of the items frequently change, such as when sellers or other suppliers of the items frequently modify item prices (e.g., in an attempt to perform yield management and maximize overall profits). The prices of items may change frequently when the items are of a limited quantity and are perishable (e.g., concert tickets and airline tickets). In such environments, the likelihood of future price changes may be high or even a certainty, but it may be difficult or impossible for the potential acquirer to determine whether the future price changes are likely to be increases or decreases, let alone the likely magnitude and timing of such changes. A large number of types of items may have such frequent price changes, such as airline tickets, car rentals, hotel rentals, gasoline, food products, jewelry, various types of services, etc. Moreover, a potential acquirer may in some situations need to evaluate not only a current price of an item of interest from a single seller or other provider, but may need to consider prices offered by other providers and/or prices for other items that are sufficiently similar to be potential substitutes for the item of interest (e.g., airline flights with the same route that leave within a determined period of time, whether from the same airline or from competitor airlines).

In a similar manner, some sellers or other providers of items may similarly face difficulties in determining an advantageous strategy related to the providing of the items, such as for intermediary sellers that must acquire an item from a third-party supplier (e.g., an original supplier of the item or other intermediary seller) before providing it to a customer. For example, it may be difficult in at least some situations for such intermediary sellers to know what price to offer to customers in order to maximize profit, as well as whether to immediately acquire from a third-party supplier an item purchased by a customer or to instead delay such an acquisition in an attempt to later acquire the item at a lower price. In the context of the airline industry, for example, such intermediary sellers may include various types of travel agents, including travel agents that typically buy only single airline tickets in response to explicit current instructions from a customer, consolidators that buy large numbers of airline tickets in advance for later resale, tour package operators that buy large numbers of airline tickets for bundling with other tickets and/or services, and so on.

DETAILED DESCRIPTION

Figure 1:
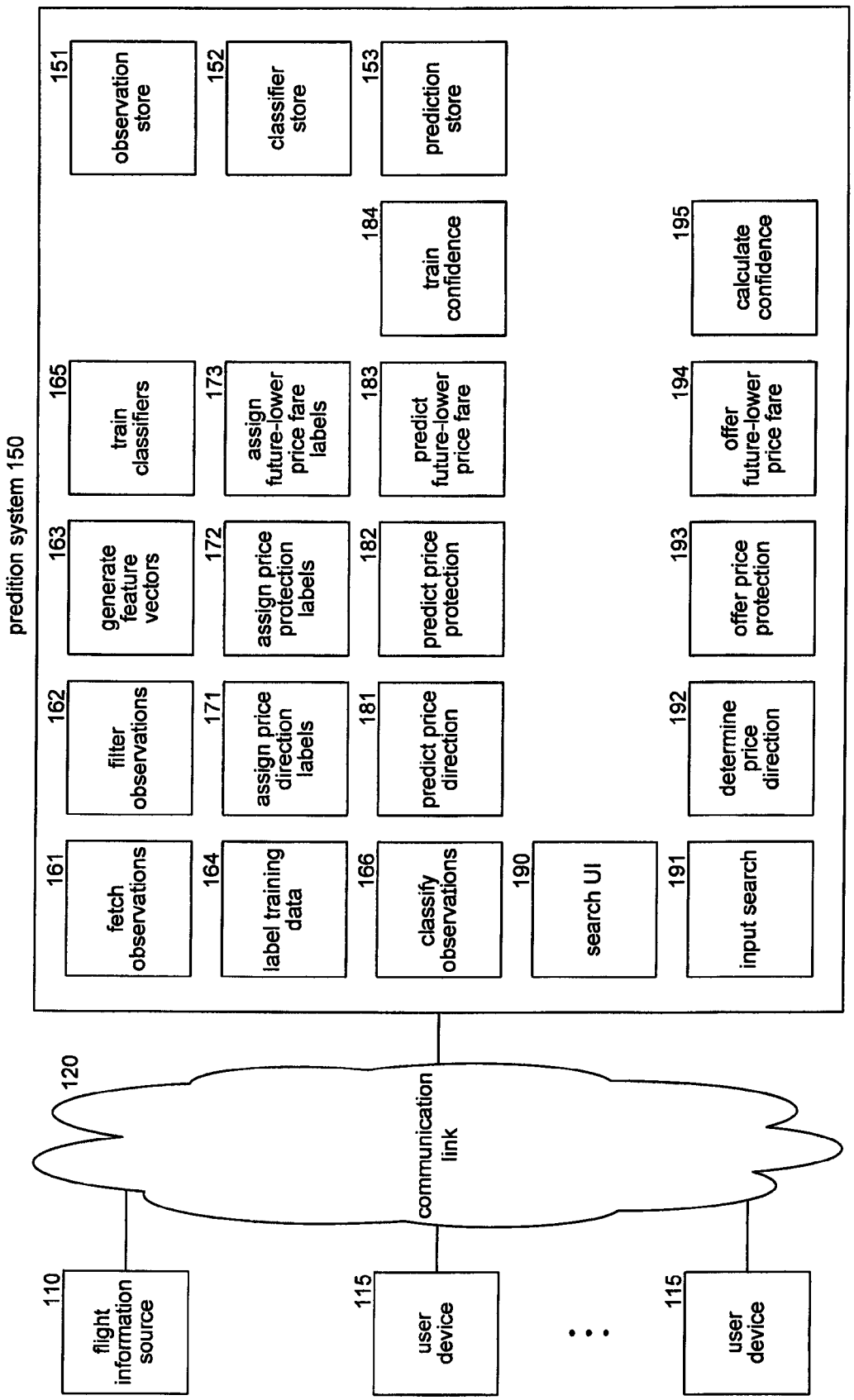
FIG. 1 is a block diagram that illustrates components of the prediction system in one embodiment.

A method and system for making predictions for travel items is provided. In one embodiment, a prediction system collects travel information for the travel items on various observation dates. The travel items may be airline trips, hotel rooms, rental cars, ship cruises, travel packages, or other travel-related items. The prediction system may collect the travel information at a specified observation rate (e.g., weekly, once daily, and twice daily) or at a variable observation rate (e.g., weekly during a low demand period and daily during a high demand period). If the travel information is collected more often than daily, then an observation date and time may be associated with each collection of travel information referred to as an "observation." The prediction system then assigns a label to each travel item for each observation date with enough subsequent observation dates to generate a label indicating what the prediction should have been for the travel item on the observation date. For example, when the travel item is an airline trip and the prediction relates to price direction, the prediction system assigns a label to a trip indicating what the price direction prediction for that trip should have been on that observation date based on analysis of actual travel information observed on subsequent observation dates. The prediction system then trains a classifier to make predictions for a travel item using the travel information and labels of the travel items as training data. The prediction system can then generate a prediction for a target travel item by applying the trained classifier to travel information of the target travel item.

In one embodiment, the prediction system makes price-related predictions of items based on training a classifier using historical information including pricing information for the travel items and including labels relating to the price-related prediction that are generated automatically from subsequent historical information. The prediction system may be used to make price-related predictions for airline tickets. The prediction system collects flight information for flights on a daily basis or at another observation rate. The date that flight information is collected is referred to as the observation date of the flight information. The prediction system generates training data to train a classifier to make the price-related predictions using the flight information. The prediction system first generates feature vectors representing each trip (e.g., unique departure airport and date and return airport and date combination) for each observation date. Thus, a feature vector for a trip represents an aggregation on information derived from the airline flights for that trip. The prediction system then generates a label for the price-related prediction for each trip for each observation date with enough subsequent observation dates to determine what the price-related predictions should have been for that observation date. The subsequent observation dates that are used to generate labels for an observation date are collectively referred to as a labeling window. Thus, the prediction will not generate labels for observation dates that do not have enough subsequent observation dates to fill the labeling window. For example, if the labeling window includes seven observation dates (assuming observations are made on a daily basis), then the prediction system will only generate labels for observation dates more than seven days in the past. One skilled in the art will appreciate that the labeling window can include a varying number of observations. For example, the labeling window could include, for airline tickets, seven observations, for hotel rooms, seven or fourteen observations, for used automobiles, one or two observations, and so on. Thus, the prediction system trains the classifier using feature vectors generated from observation dates with enough subsequent observation dates to generate labels. The prediction system then can make the price-related predictions for a target trip by retrieving current flight information for the trip, generating a feature vector for the trip, and submitting the generated feature vector to the trained classifier to make the price-related prediction.

In one embodiment, the prediction system collects observations of flight information for all possible trips on a daily basis and stores the flight information in association with its observation date. A trip is defined as a particular market and a particular departure and return date combination. For example, a market may be Seattle to Boston, Boston to Seattle, or Seattle to San Francisco. A departure and return date combination may be January 1 and January 5 or January 2 and January 5. Continuing with the example, one trip might be Seattle to Boston departing on January 1 and returning on January 5, another trip might be from Seattle to Boston departing on January 2 and returning on January 5, and another trip might be from Boston to Seattle departing on January 2 and returning on January 5. Each trip may have multiple available flights. For example, the trip from Seattle to Boston departing on January 1 and returning on January 5 may have four available flights. Airline A may have a flight that departs at 6 a.m. on January 1 and returns at 5 p.m. on January 5, and a flight that departs at 6 a.m. on January 1 and returns at 10 p.m. on January 5. Airline B may have a flight that departs at 10 a.m. on January 1 and returns at 12 p.m. on January 5, and a flight that departs at 3 p.m. on January 1 and returns at 12 p.m. on January 5. An observation of a trip is flight information relating to all the flights of the trip. Each observation has an associated observation date that is the date the flight information for the flights of a trip was collected. For example, on December 20, the prediction system may collect the flight information for all flights from Seattle to Boston departing on January 1 and returning on January 5. In such a case, the observation includes flight information for the four flights of Airlines A and B with an observation date of December 20. If on the next day, December 21, the prediction system collects the flight information for the same trip, it will have another observation for the trip but with an observation date of December 21. The prediction system may collect flight information for each flight that includes market, departing date and time, returning date and time, airline, available seats, classes of available seats, number of stops, ticket restrictions, and so on. The flight information may be collected directly from the airlines or from an aggregation service that aggregates flight information for multiple airlines. The prediction system may collect the observations for all trips on a daily basis and store the observations in an observation store.

In one embodiment, the prediction system uses the observations to train a classifier to generate price-related predictions. For example, the prediction system may train a classifier using the observations to predict the likely direction of the ticket price for a trip. The prediction system may train a single classifier to classify the price direction for any market or may train a separate classifier for each market. The prediction system trains a classifier by generating a feature vector representing the flight information of a trip. The feature vector may include core features and derived features. A core feature represents a feature generated from the flight information for a single observation date. For example, the core features may include market, departure date, return date, minimum airline ticket price, an average airline ticket price, a maximum airline ticket price, the number of flights with an airline ticket price near the minimum ticket price, total number of available seats on all flights with an airline ticket price near the minimum ticket price, number of days until the current fare expires, and so on. Other features may indicate time of year (e.g., season), holiday season (e.g., spring break), and so on. A derived feature represents a feature generated from the flight information of a trip across multiple observation dates. For example, the derived features may include a moving average of a core feature, a difference between a derived feature and a core feature, a difference between a core feature of one observation date and the core feature of another observation date, and standard deviation within a Gaussian distribution. The prediction system may also learn a feature using a feature classifier, which then becomes part of the feature vector of the training data. After making the observations for an observation date, the prediction system then generates a feature vector for each trip of that observation date and stores the feature vector in the observation store. In one embodiment, the prediction system may limit the trips for which it retrieves flight information to trips that depart in the next 90 days and that are for durations of 2 to 8 days. One skilled in the art will appreciate that the retrieved flight information can be for any number of departure dates and number of duration lengths combinations. Thus, for each market, the prediction system will collect flight information for 630 trips (e.g., 90*7). The 630 possible trips are illustrated in the following table.

| Trip Number | Departure Date | Return Date |
|---|---|---|
| 1 | 1 | 3 |
| 2 | 1 | 4 |
| 3 | 1 | 5 |
| ... | | |
| 7 | 1 | 9 |
| 8 | 2 | 4 |
| 9 | 2 | 5 |
| ... | | |
| 14 | 1 | 10 |
| 15 | 3 | 5 |
| ... | | |
| 623 | 89 | 97 |
| 624 | 90 | 92 |
| 625 | 90 | 93 |
| ... | | |
| 630 | 90 | 98 |

After generating feature vectors for the trips of an observation date, the prediction system then assigns labels to the feature vectors for training a classifier to make the price-related predictions. The feature vectors and their corresponding labels represent the training data that is used to train the classifier. The price-related prediction may be a prediction of future price direction, of whether price protection should be offered on a trip (described below), of whether a future-lower priced fare should be offered for a trip (described below), and so on. If the prediction system makes predictions for 2000 markets and for 630 trips within each market on a daily basis, the prediction system would need to generate labels for 1,260,000 trips each day. It would be impractical to manually label such a large number of trips. To allow for the automatic labeling of trips, the prediction system assigns labels to the trips of a given observation date based on analysis of the observations of the trip for the following few observation dates (e.g., 7 dates), which are referred to as a labeling window. For example, on January 8, the prediction system may collect the flight information for all trips and generate the corresponding feature vectors. The feature vectors for the observation dates of January 2 through January 8 are considered to be the labeling window for feature vectors for the observation date of January 1. Similarly, the feature vectors for the observation dates of January 1 through January 7 would be the labeling window for feature vectors of the observation date of December 31. To generate a label for the feature vectors of an observation date, the prediction system analyzes the feature vectors within the labeling window for that observation date to determine what label to assign to each trip for that observation date. For example, if the prediction system is predicting price direction, for each trip on an observation date, the prediction system may compare the minimum price of that trip on the observation date to the minimum price of that trip within the labeling window. If the minimum price has increased significantly within the labeling window, then the prediction system may assign a label indicating that that the airline ticket for that trip is likely to increase. If the minimum price has decreased significantly within the labeling window, then the prediction system may assign a label indicating that the airline ticket price for that trip is likely to decrease. Thus, the prediction system is able to label all trips for all observation dates that have a big enough labeling window of future observation dates for which flight information has already been collected. The prediction system stores the labels of the trips in the observation store.

After assigning labels to the trips at a prediction date, the prediction system then trains a classifier to make price-related predictions. For example, the prediction system may generate a classifier for each market to predict the price direction within that market. To train a classifier for a market, the prediction system may use all the labeled trips for that market. For example, if the prediction system has labeled trips from October 1 through December 31, then for each market, the prediction system retrieves the feature vectors and labels for each trip within that market that was observed between October 1 and December 31. Since there are 92 observation dates and 630 trips for each observation date for each market, the training data will include 57,960 (e.g., 92*630) feature vector and label pairs for each market. The prediction system then trains the classifier. The prediction system may also use observation dates for similar time periods in prior years to train a classifier. For example, the prediction system may train a classifier for making price-related predictions for departure and return dates around the year-end holidays or a spring break using only observations covering similar departure and return dates from previous years.

The prediction system may use a variety of well-known classifiers to make the price-related predictions. For example, the classifiers may include a neural network-based classifier, a decision tree classifier, support vector machine, a family of linear classifiers, a Bayesian classifier, a Naive Bayesian classifier, a regression-based classifier, and so on. The prediction systems may also use ensemble learning techniques that include boosting, bagging, random forests, error correcting output codes, stacking, and so on.

In one embodiment, the prediction system may use a support vector machine for classification. A support vector machine operates by finding a hyper-surface in the space of possible inputs. The hyper-surface attempts to split the positive examples (e.g., feature vectors for observations whose direction should be up) from the negative examples (e.g., feature vectors for observations whose direction should be down) by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically.

In one embodiment, the prediction system may use a neural network for classification. A neural network has three major components: architecture, cost function, and search algorithm. The architecture defines the functional form relating the inputs to the outputs (in terms of network topology, unit connectivity, and activation functions). The search in weight space for a set of weights that minimizes the objective function is the training process. A neural network may use a radial basis function ("RBF") network and a standard gradient descent as a search technique.

In one embodiment, the prediction system uses a decision tree for classification. A decision tree classifier is used to classify data by applying rules of the tree to the data until a leaf node is reached. The data is then assigned the classification (e.g., increasing price direction or decreasing price direction) of the leaf node. A decision tree classifier is typically represented by rules that divide data into a series of binary hierarchical groupings or nodes. Each node has an associated rule that divides the data into two child groups or child nodes. A decision tree is constructed by recursively partitioning training data. At each node in the decision tree, the prediction system selects a partition that tends to maximize some metric. The prediction system recursively selects sub-partitions for each partition until the metric indicates that no more partitions are needed. A metric that is commonly used is based on information gain. Decision tree classifiers and appropriate metrics are described in Quinlan, J. R., "Programs for Machine Learning," Morgan Kaufmann Publishers, 1993, which is hereby incorporated by reference.

The prediction system may use an adaptive boosting technique to train the decision tree classifiers. Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on the training data using different weights. The algorithm concentrates more and more on those examples in which its predecessors tended to show mistakes by weighting the training data for those mistakes more heavily. The algorithm tends to correct the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier.

In one embodiment, the prediction system uses adaptive boosting to train decision tree classifiers to predict the direction of airline ticket prices. The prediction system may predict the price directions of up, flat or up, flat, flat or down, or down. One skilled in the art will appreciate that many different levels of price direction may be predicted such as only up and down, only up, the five mentioned above plus very up or very down, and so on. The price directions of up, flat, and down are considered strong predictions because the price will likely be in the predicted direction. The price directions of flat or up and flat or down are considered weak predictions because it cannot be predicted whether the price will stay flat or go in the indicated direction. The price prediction system may favor making strong predictions to provide a definitive prediction of price direction. The prediction system may train a classifier for each of the five price directions. In one embodiment, the prediction system may use multi-level decision tree classifiers for the strong predictions and a single-level decision tree classifier for the weak predictions. For the multi-level decision tree classifiers, the prediction system may randomly generate the features to use for the test in each level of the decision tree and the training algorithm selects the best test for each node of the decision tree. Because of the random selection of features, the prediction system may select a feature that is a very poor choice for classification. To minimize the effect of the classifier that uses such a feature, the prediction system reduces the effect a newly generated weak classifier will have on determining the training weights for the feature vectors for the next weak classifier that were incorrectly classified. One skilled in the art will appreciate that the classifiers can be retrained frequently to reflect changing price-related conditions.

After the training, the prediction system is ready to make predictions using the classifier. For example, the prediction system may be used in conjunction with a user interface that provides airline flight information. A user may be interested in flight information for a particular trip, that is, a particular market (e.g., Seattle to Boston) for a particular departure and return date combination (e.g., departing February 1 and returning February 5). Upon receiving a query for the trip, the prediction system may collect the flight information for all the flights of that trip from a flight information source. The prediction system then generates a feature vector for that trip. The prediction system submits that feature vector to the classifier for that particular market to identify the price-related prediction. The user interface may then present the flight information to the user along with the price-related prediction or an offer made because of the price-related prediction. Because it may take a significant amount of time to generate a feature vector for a trip and use a classifier to generate a price-related prediction, the prediction system may generate predictions in batch mode on a daily basis. For example, after the prediction system collects the observations for the current date, generates the feature vectors for the observations of the current date, and trains the classifier, the prediction system may then use the trained classifier to generate predictions based on the generated feature vectors for the current date. The prediction system then stores the prediction for each trip. When a user subsequently requests flight information for a particular trip later that day, the prediction system retrieves the previously stored price-related prediction and presents it to the user. The prediction system, although having been trained using information for certain departure dates and durations, can be used to make predictions for any departure date and duration. For example, although trained with durations up to 8 days, the prediction system can make predictions for durations of 14 days or more.

In one embodiment, the prediction system may provide a confidence level for a price-related prediction. For example, the prediction system may predict that the price direction of a certain trip may be up with a 0.8 confidence level indicating a high confidence that the price will go up in the short term (e.g., days of the labeling window). A classifier, however, may provide a score not directly related to confidence level. In such a case, the prediction system trains a function to map the classifier scores to confidence levels. The prediction system may take the feature vectors for trips with observation dates with enough subsequent observation dates and generate labels indicating whether the price-related prediction for that trip was correct based on analysis of the actual observations within the labeling window. The prediction system then trains a weight and a bias for a sigmoid function to map the scores to a confidence level. When the prediction system next makes a price-related prediction (e.g., price direction), the prediction system can use the sigmoid function to map the scores of the classifier to confidence levels. One skilled in the art will appreciate the many different learning techniques that can be used to generate a mapping from a score to a confidence level.

In addition to predicting fare direction, the prediction system may be used to predict the likely amount of change. The prediction system may generate classifiers for each market to predict the amount of change in the up direction and in the down direction. The prediction system may generate training data for a market by labeling the feature vectors for each trip for that market based on the prices in the labeling window for various observation dates. If the classifier is to predict the amount of change for the up direction, the prediction system may for each trip identify the observations with price increases in the labeling window and then label the trip with the mean or median of those increases or with the percentage of change (e.g., 20% or 40%). The prediction system then trains the classifier for the up direction using the training data. The prediction system can then generate a feature vector for a current observation and apply the classifier to the feature vector to predict the amount or percent of increase. When the prediction system determines that the likely direction will be up for a trip, the prediction system can retrieve the predicted amount of increase or use the percent of increase to generate likely amount of increase based on the current lowest price.

In one embodiment, the price prediction system may predict whether it would be economical to offer price protection for a trip at a protection price (e.g., current lowest price) for a protection fee to a consumer. When the consumer purchases price protection for the protection fee, the seller of the price protection agrees that if the consumer purchases a ticket for the trip in the next few days and the lowest price available for a ticket is greater than the protection price, the seller will compensate the consumer for the higher price. Price protection increases consumer confidence when making purchases by reducing the risk associated with fluctuating prices. A price protection system is described in U.S. patent application Ser. No. 11/599,607, entitled "System and Method of Protecting Prices" and filed on Nov. 13, 2006, which is hereby incorporated by reference. The prediction system may train a classifier for each market to predict whether price protection should be offered for the trips within that market. The prediction system generates labels for the trips on an observation date based on whether it would have been economical to sell price protection for the trips based on analysis of flight information for subsequent dates. The prediction system then trains classifiers to predict whether to offer price protection.

In one embodiment, the prediction system may predict whether it would be economical for a party other than an airline providing a flight for a trip to offer an airline ticket for that trip at a price that is lower than the current price, referred to as a future-lower priced fare. If the prediction system predicts that the current lowest price for a trip will decrease over the next several days, then that party may want to offer to sell a ticket for that trip at a price that is lower than the current lowest price. For example, the party may offer future-lower priced fares at a 7% discount off the current lowest price when such offering would be economically profitable. For example, if the party's overhead is 3% of the ticket price (e.g., including credit card charges), the party may want to offer a future-lower priced fare whenever the current lowest price for a trip is predicted to drop by at least 10%. If the party offers the trip for the future-lower priced fare and the user accepts the offer, the party will then try to buy an actual ticket at the lowest possible price over the next few days. If the party purchases a ticket for less than the future-lower priced fare minus overhead, the party keeps the difference as profit. If the party purchases a ticket for more than the future-lower priced fare minus overhead, the party loses money. Because ticket prices generally vary based on departure and return time of day, the prediction system may divide the trips of a market into submarkets based on time of day. For example, the prediction system may divide each day into six intervals of four hours each. Thus, there are 36 possible submarkets: one for each combination of departure and return intervals. The prediction system may train the classifier to predict whether to offer future-lower priced fares on a submarket basis so that future-lower priced fares can be offered on a submarket basis. One skilled in the art may appreciate that the intervals may not be uniform. For example, the first interval may be from midnight to 6 a.m., the second interval may be 6 a.m. to 9 a.m., and so on. The prediction system generates labels for trips on an observation date based on analysis of flight information for the trips on subsequent observation dates indicating the economics of offering a future-lower priced fare. The prediction system then trains a classifier to predict whether to offer a future-lower priced fare.

The prediction system can be used to present predictions in various ways. For example, a web-based system could receive trip-related queries from customers, and use the prediction system to make predictions for the trips, and present the results of those predictions to the customer. The prediction system may provide a web service interface through which third parties can retrieve certain predictions. For example, a search engine service may request predictions for trips to Florida, when a user submits the query "Florida resorts." The search engine can then provide a related prediction with the search results. Alternatively, an advertising system may bid to place an advertisement for queries that include the keyword "Florida." In such a case, the advertising system may interact with the prediction system to generate advertisements based on predictions. For example, if the query is "Florida resorts," the advertisement may list the predicted lowest fares from various departure cities to various locations in Florida. The prediction system may also publish predictions to various subscribers. For example, a travel web site may subscribe to receive predictions of the lowest fares for various U.S. cities to various African cities. In such a case, the prediction system may publish the corresponding predictions to the travel web site on a daily basis so that predictions can be added to web pages relating to African safaris. The predictions system may also provide RSS feeds to users who specify trips of interest.

The prediction system may use business rules to control risk associated with predictions. For example, when a certain event in a city is announced (e.g., a visit by a dignitary), a rule may be established to not offer any future-lower price fares on trips to that city because of uncertainty in the fares. As another example, a business rule may be established that indicates only a certain number of price protected trips overall or within a certain market should be outstanding at any time to limit the exposure risk. For example, if a dignitary announces a trip to a city, the ticket prices may likely raise because of demand. If customers upon hearing the announcement rush to buy price protecting before a specific rule related to that announcement can be defined, the general rule will limit risk until the specific rule is defined.

The prediction system may make predictions using classifiers that are not market specific. For example, the prediction system may train a classifier using the training data collected from all markets. In such a case, the classifiers can be used to make predictions for trips in any market. The prediction system may select to train the classifiers using only training data derived from representative markets. Alternatively, the prediction system may train separate classifiers for various collections of markets. For example, all markets with departure and return locations within the U.S., all markets with a departure location in the U.S. and a return location in Europe, all markets with a departure location in the western U.S. and a return location in the eastern U.S., and so on. Because each classifier is trained using multiple markets, the classifier may be able to make accurate predictions for an event that occurs in one market for the first time based on similar events that occurred in other markets. When training a classifier with data from multiple markets, the prediction system may need to normalize the features. For example, the fare changes from one observation to the next may be represented as percentage of change, rather than absolute value of change. As another example, when the predictions of direction within a market have not been particularly accurate, the prediction system may have a rule to change a strong up or down prediction to a weaker up or down prediction or reduce the confidence level.

The prediction system can also be used to make price-related predictions for hotel rooms. The hotel rooms for a particular hotel market (e.g., city and hotel rating) may be aggregated in a similar manner to how the airline flight information for a flight market is aggregated. For example, the four star hotels in New York City can represent one market, the one star hotels in New York City can represent another market, the four star hotels in Las Vegas can represent yet another market, and so on. The hotel markets could further be divided into type of room (e.g., single king size bed, two double beds, suite). Alternatively, the type of room could simply be a feature of the feature vector representing hotel rooms in the market. The prediction system can collect hotel information on a daily or some other basis for various stays in each market similar to how information for airline trips are collected. A stay may be a particular arrival and departure date combination for a market. For example, one stay may be arriving on January 1 and departing on January 5 for a four star hotel in New York City, another stay may be arriving on January 1 and leaving on January 3 for a four star hotel in New York City, yet an other stay may be arriving on January 1 and departing on January 5 for a one star hotel in Las Vegas. The prediction system may generate a feature vector for each stay for each hotel market using various observation dates and generate a label for each feature vector based on the price or other attribute to be predicted in a labeling window. The core features may include price, type of room, number of beds, size of room, view indicator, exercise facility indicator, mini bar indicator, availability, neighborhood, proximity to airport, and so on. The derived features may include various moving average prices, changes in availability, and so on. Once a classifier is trained for a market, the prediction system can use the classifier to predict the various attributes (e.g., price direction and room availability).

In addition to price-related predictions, the prediction system can be used to non-price related predictions. For example, the prediction system can be used to predict the likely availability of seats for a trip or hotel rooms. In the case of airline seats, the prediction system may label the feature vectors of the trips based on comparison of availability for the observation date being labeled and labeling window that include the next 30 observation dates. After training a classifier for a market, the prediction system may predict the availability of seats for the next 30 days. The prediction system may also generate separate classifiers for different prediction periods such as the next seven days, the next two weeks, and the next month.

The prediction system may also use various alternate communication channels for providing travel-related predictions. The prediction system may allow a user to register a search criterion of interest. The prediction system can periodically generate predictions and send those predictions to the user via one of the alternate communication channels. The alternate communications channel may include RSS feeds, electronic mail messages, text messages, telephone messages, and so on. The user may specify the frequency at which to receive the predictions and conditions for when a prediction is to be sent (e.g., when the predicted direction changes and, when the flight becomes 90% full).

In one embodiment, the prediction system provides advice as to whether to wait or buy a ticket based on maximization of the purchaser's expected profit. For example, the lowest fare may be expected to drop by 3% with a probability of 0.8, but the lowest fare may be expected to rise by 50% with a probability of 0.2. In such a case, the purchaser should buy the ticket now and give up the potential 3% savings to avoid the possibility of a 50% loss. So, in general, if the prediction system does not expect that the purchaser will not have a significant savings (e.g., >5% off the current fare), the prediction system advises the purchaser to buy now. The prediction system may present to the purchaser a graph of the probability of various fare decreases and fare increases. The graph may be a bar chart that, for different fare change amounts (e.g., $10, $20, $30), shows the probability of an increase or a decrease by that amount. The prediction system provides this more detailed probability information so that the purchaser can make buy or wait decisions based on their personal risk tolerances.

FIG. 1 is a block diagram that illustrates components of the prediction system in one embodiment. The prediction system 150 is connected via communications link 120 to flight information source 110 and user devices 115. The prediction system includes an observation store 151, a classifier store 152, and a prediction store 153. The observation store contains the flight information collected from the flight information source (e.g., Sabre, ITA Software, airlines, or hotels) for each observation date for each market and for each trip within each market. The observation store also includes the feature vectors for each trip for each observation date along with the assigned labels for those observation dates within a labeling window of subsequent observation dates. The classifier store contains the parameters that represent the classifiers that were generated when the classifiers were trained. For example, the parameter may include the tests of each decision tree along with a weight for each decision tree. When the prediction system uses batch mode predicting, the prediction store contains the prediction for the current date for each trip of each market.

The prediction system also includes a fetch observations component 161, a filter observations component 162, a generate feature vectors component 163, a label training data component 164, a train classifiers component 165, and a classify observations component 166. The fetch observations component is responsible for collecting all the flight information for each flight of each trip of each market for each observation date. The fetch observations component stores the flight information in the observation store.

The filter observations component is responsible for filtering the observations to remove information that may negatively impact the ability of the prediction system to accurately make predictions. For example, the filter observations component may identify when an airline is offering its tickets at a "sale" price for a particular market and not use the sale ticket prices when training the classifier. The filter observations component may also identify when an airline has raised its price for a particular market or markets because of an unusual event. For example, the ticket prices to a particular city may spike when a dignitary announces plans to visit that city the following week. The filter observations component may also randomly copy non-price flight information for a specific flight from the next observation to the previous observation to account for uncertainty in the correlation between price flight information and non-price flight information. When a price changes during a day, the flight information that may have caused the price change may be the flight information collected at the beginning of the observation date, the flight information collected at the beginning of the next observation date, or some combination of the two observations. To more accurately represent the cause of a price change, the filter observations component randomly replaces the non-price flight information for 50% of the trips of an observation date with the corresponding flight information collected for the next observation date. The filter component may also remove price information that is apparently incorrect. For example, due to a collection error, the price of a flight may be unusually low (e.g., $1) or unusually high (e.g., $999,999).

The generate feature vectors component generates the feature vectors for each trip of each market for each observation date. The label training data component generates and assigns labels to each trip within each market. If the prediction system makes multiple types of price-related predictions, then the label training data component may invoke an assign price direction labels component 171, an assign price protection labels component 172, and an assign future-lower priced fare labels component 173. The train classifiers component trains the classifiers to make the price-related predictions based on the training data. After the classifiers are trained, the classify observations component classifies the current observations to generate the price-related predictions in batch mode. The classify observations component invokes a predict price direction component 181, a predict price protection component 182, and a predict future-lower priced fare component 183, and a train confidence component. The train confidence component generates a classifier to map from the score of a classifier to a confidence level of the prediction based on the score.

The prediction system also includes a search user interface component 190, an input search component 191, a determine price direction component 192, an offer price protection component 193, an offer future-lower priced fare component 194, and a calculate confidence component 195. The search user interface component receives an input search from a user that identifies a trip of interest. The search user interface component then accesses the flight information source to retrieve real-time flight information for the trip of interest. The search user interface component then invokes the determine price direction component, the offer price protection component, and the offer future-lower priced fare component to generate price-related predictions for the desired trip. The search user interface component may then use the price-related predictions to determine how to respond to the user. For example, the search user interface component may offer price protection without providing information about the predicted direction or without offering a future-lower priced fare. Alternatively, the search user interface component may offer a future-lower priced fare without offering price protection or displaying a predicted price direction. The calculate confidence component maps a score returned by a classifier into a confidence.

Figure 2:
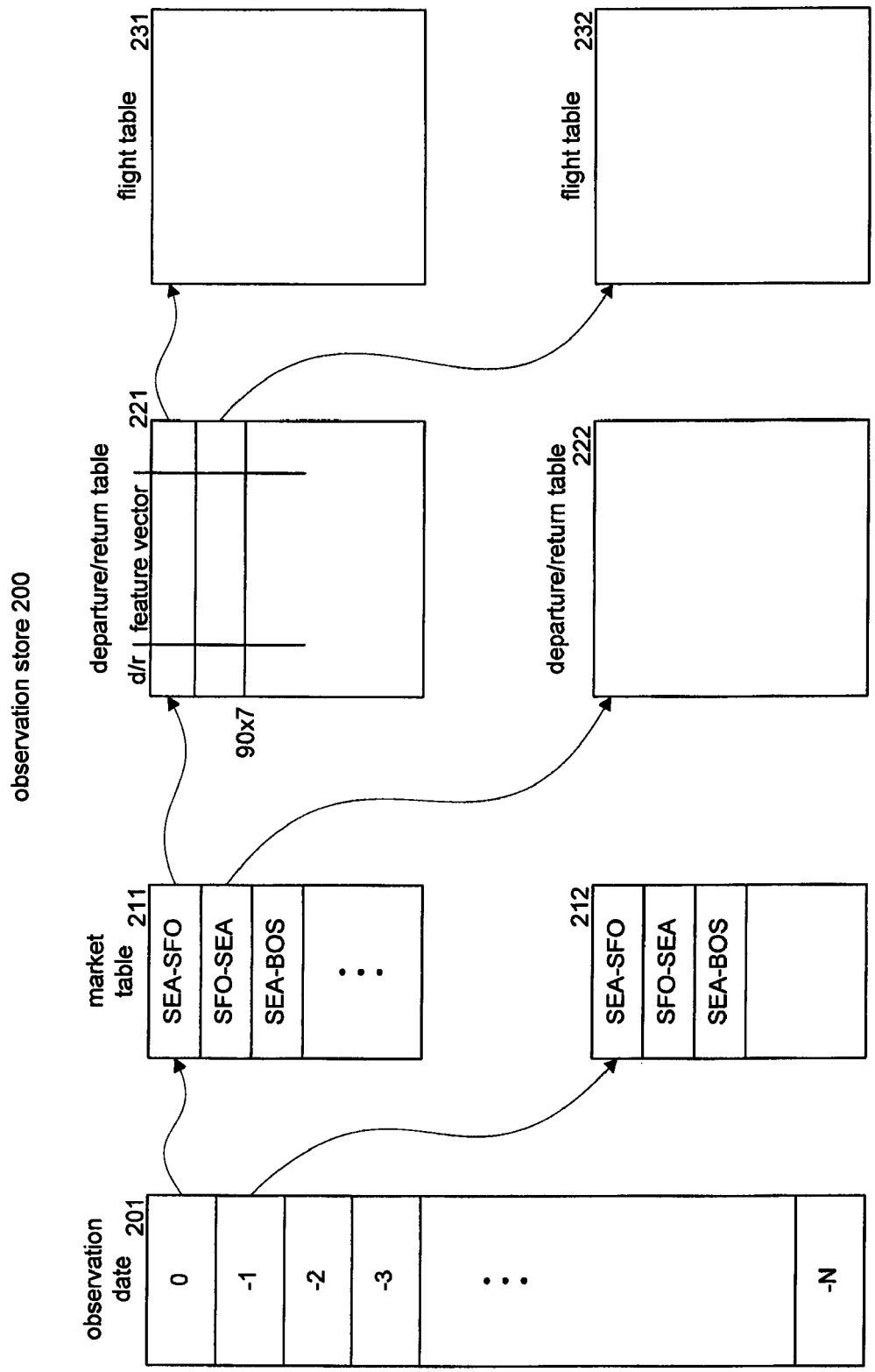
FIG. 2 is a block diagram that illustrates data structures of the observation store in one embodiment.

FIG. 2 is a block diagram that illustrates data structures of the observation store in one embodiment. The observation store 200 includes an observation date table 201 that contains an entry for each observation date starting with the most current observation date. Each entry contains a reference to a market table 211-212. Each market table contains an entry for each market that contains a reference to a departure/return table 221-222. The departure/return table contains an entry for each possible trip within the associated market. Each entry identifies the departure/return date of the trip and contains a reference to a flight table 231-232. Each flight table contains an entry for each flight for the trip identified by the associated market and departure/return date. Each entry of the flight table contains the raw flight information collected from the flight information source by the fetch observation component. The departure/return table may also contain a feature vector for the corresponding trip generated by the generate feature vector component. The departure/return table may also contain the labels generated by the label training data component.

Figure 3:
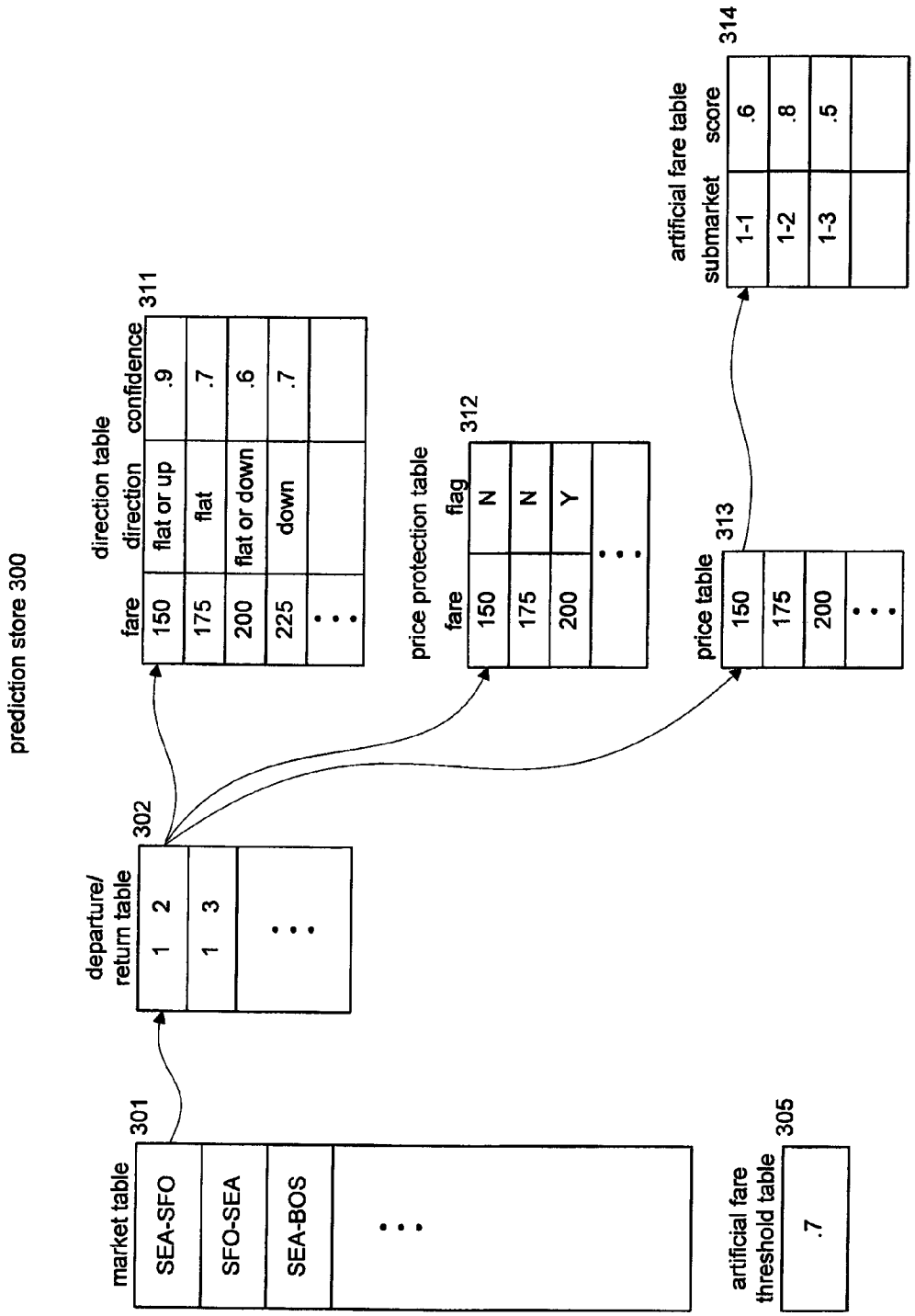
FIG. 3 is a block diagram that illustrates data structures of the prediction store in one embodiment.

FIG. 3 is a block diagram that illustrates data structures of the prediction store in one embodiment. The prediction store 300 includes a market table 301 with an entry for each market. Each entry contains a reference to a departure/return table 302 that contains an entry for each departure/return date combination for that market (i.e., each trip within that market). Each entry of a departure/return table contains a reference to a direction table 311, a price protection table 312, and a price table 313. The direction table contains an entry for various ticket prices that contains an indication of the direction associated with each ticket price and a confidence in the direction. When the prediction system generates price-related predictions in a batch mode, the predictions are based on the current prices of the tickets at the time the prediction is made. Airline tickets prices, however, may change frequently, even multiple times a day. In such a case, a price direction based on the then-current price at the beginning of the day may not be appropriate for the current price in the middle of the day. As a result, the prediction system may in batch mode generate price-related predictions assuming different current prices. For example, if the current price of an airline ticket is $200, the prediction system may make the price-related predictions based on ticket prices of $150, $175, $200, $225, and so on. One skilled in the art will appreciate that the increments for making the price-related predictions can be adjusted to the desired accuracy of predictions. The direction table includes an entry for each ticket price at which a prediction is made, the direction of the prediction, and confidence level of the prediction. For example, the first entry of the direction table indicates if the ticket price is currently at $150, then it is unsure whether the ticket price will increase or stay flat over the next few days (i.e., flat or up) with a 0.9 (i.e., high) level of confidence. The price protection table contains an entry for each possible ticket price along with a flag that indicates whether price protection should be offered for the associated trip at that possible ticket price. For example, at the ticket price of $200, the flag indicates that price protection should be offered. The price table includes an entry for each possible ticket price that contains a reference to a future-lower priced fare table 314 for that trip at that ticket price. The future-lower priced fare table contains an entry for each submarket along with a score indicating whether a future-lower priced fare should be offered to a user when the user selects a trip at the associated ticket price within that submarket. The prediction store includes a future-lower priced fare threshold table 305 that contains a threshold indicating the future-lower priced fare score above which future-lower priced fares should be offered to users.

The computing devices on which the prediction system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the prediction system. In addition, the data structures may be stored or transmitted via a data transmission medium, such as a signal on a communications link. Various communications links may be used to connect the prediction system to flight information sources and user computing devices, such as the Internet, a local area network, a wide area network, a point-to-point dial-up connection, a cell phone network, and so on.

Embodiments of the prediction system may be implemented in various operating environments that include personal computers, server computers, multiprocessor systems, microprocessor-based systems, minicomputers, mainframe computers, distributed computing environments that include any of the above systems or devices, and so on. The user devices may include cell phones, personal digital assistants, smart phones, personal computers, programmable consumer electronics, digital cameras, and so on.

The prediction system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the functions of creating feature vectors, assigning labels, training classifiers, and predicting prices may all be performed on different computer systems.

Figure 4:
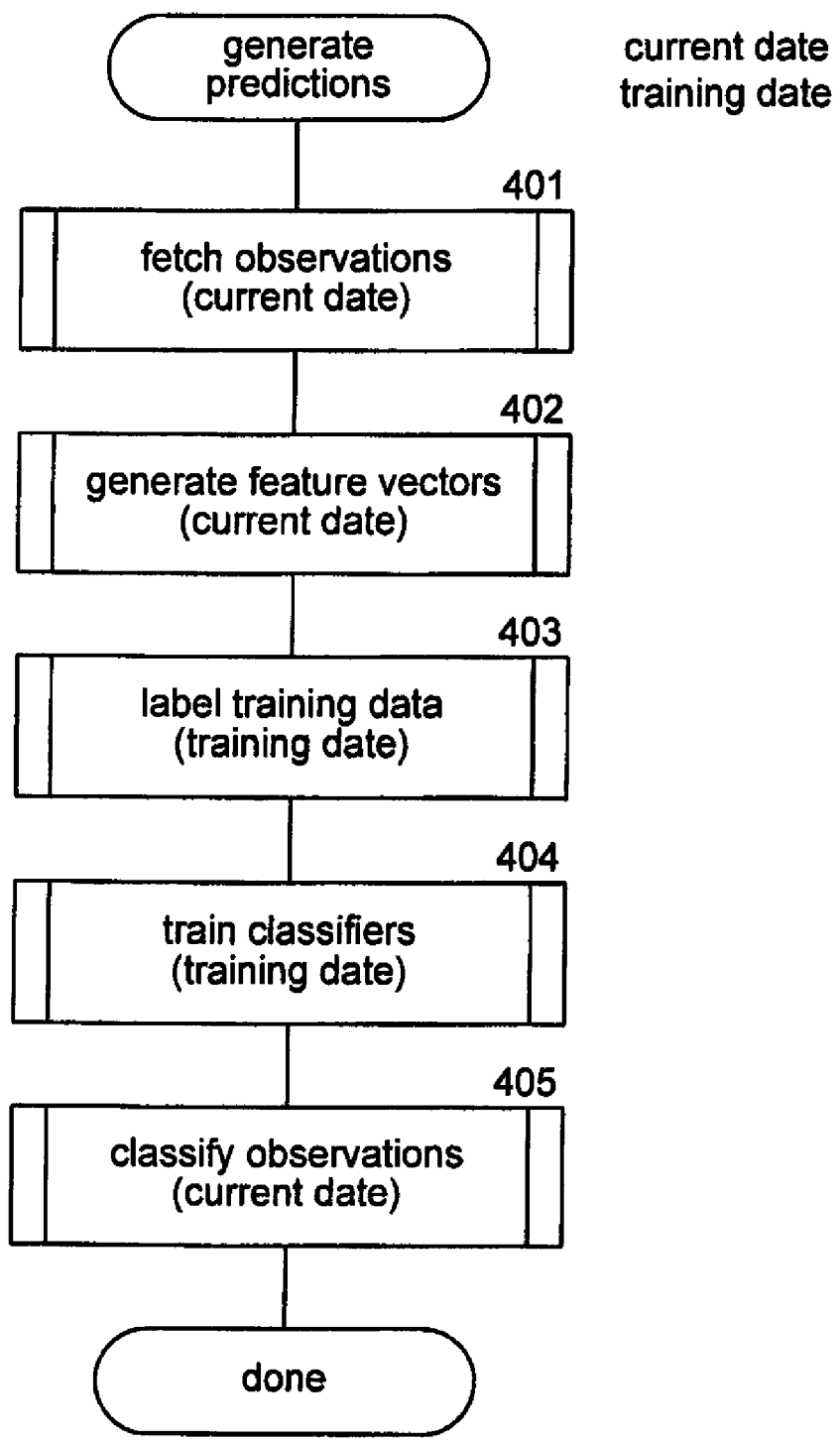
FIG. 4 is a flow diagram that illustrates the processing of a generate predictions component of the prediction system in one embodiment.

FIG. 4 is a flow diagram that illustrates the processing of a generate predictions component of the prediction system in one embodiment. The component is passed a current date and a training date. The observation dates after the training date are within the labeling window. The component fetches observations for the current date and trains a classifier to make price-related predictions based on observations collected on or before the training date using labels generated from observations made after the training date. The prediction system may invoke the generate predictions component on a daily basis. Alternatively, the prediction component may collect observations on a daily basis but train new classifiers less frequently (e.g., every fourth day). In block 401, the component invokes the fetch observations component passing the current date to fetch observations for the current date. In block 402, the component invokes the generate feature vectors component passing the current date to generate feature vectors for the observations for the current date. In block 403, the component invokes the label training data component to label the feature vectors using the observations fetched after the training date (i.e., during the labeling window). In block 404, the component invokes the train classifiers component to train classifiers using the training data as of the training date. In block 405, the component invokes the classify observations component passing the current date to classify the observations of the current date in batch mode using the trained classifiers. The component then completes.

Figure 5:
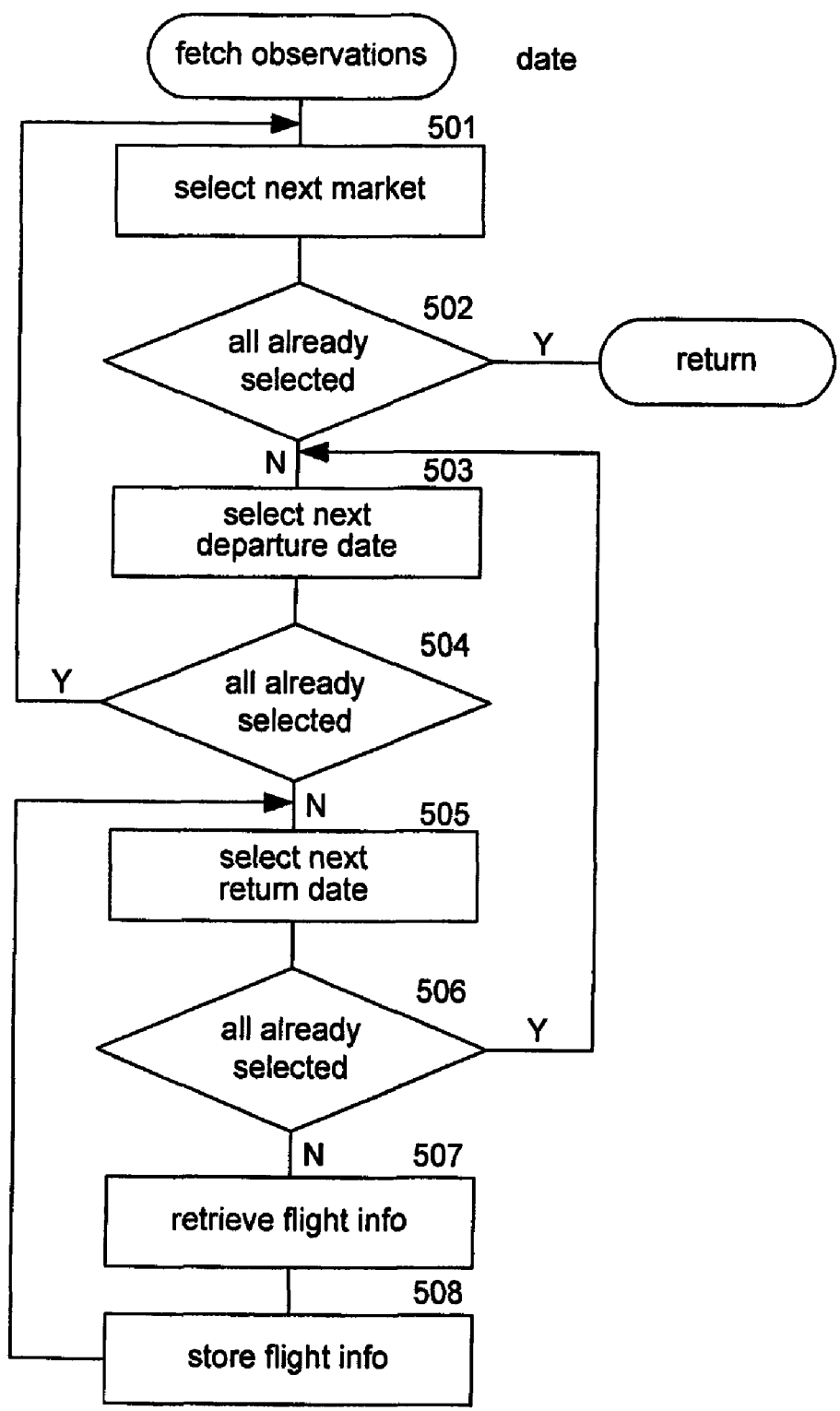
FIG. 5 is a flow diagram that illustrates the processing of the fetch observations component of the prediction system in one embodiment.

FIG. 5 is a flow diagram that illustrates the processing of the fetch observations component of the prediction system in one embodiment. The component is passed a date and fetches observations and stores them in association with that observation date. In blocks 501-508, the component loops selecting each trip within each market and retrieving flight information for that trip and storing the flight information in the observation store. In block 501, the component selects the next market. In decision block 502, if all the markets have already been selected, then the component returns, else the component continues at block 503. In block 503, the component selects the next departure date. In decision block 504, if all the departure dates have already been selected, then the component loops to block 501 to select the next market, else the component continues at block 505. In block 505, the component selects the next return date for the selected departure date. In decision block 506, if all the return dates have already been selected, then the component loops to block 503 to select the next departure date, else the component continues at block 507. In block 507, the component retrieves the flight information for the selected market and the selected departure/return date representing a trip. In block 508, the component stores the flight information and then loops to block 505 to select the next return date.

Figure 6:
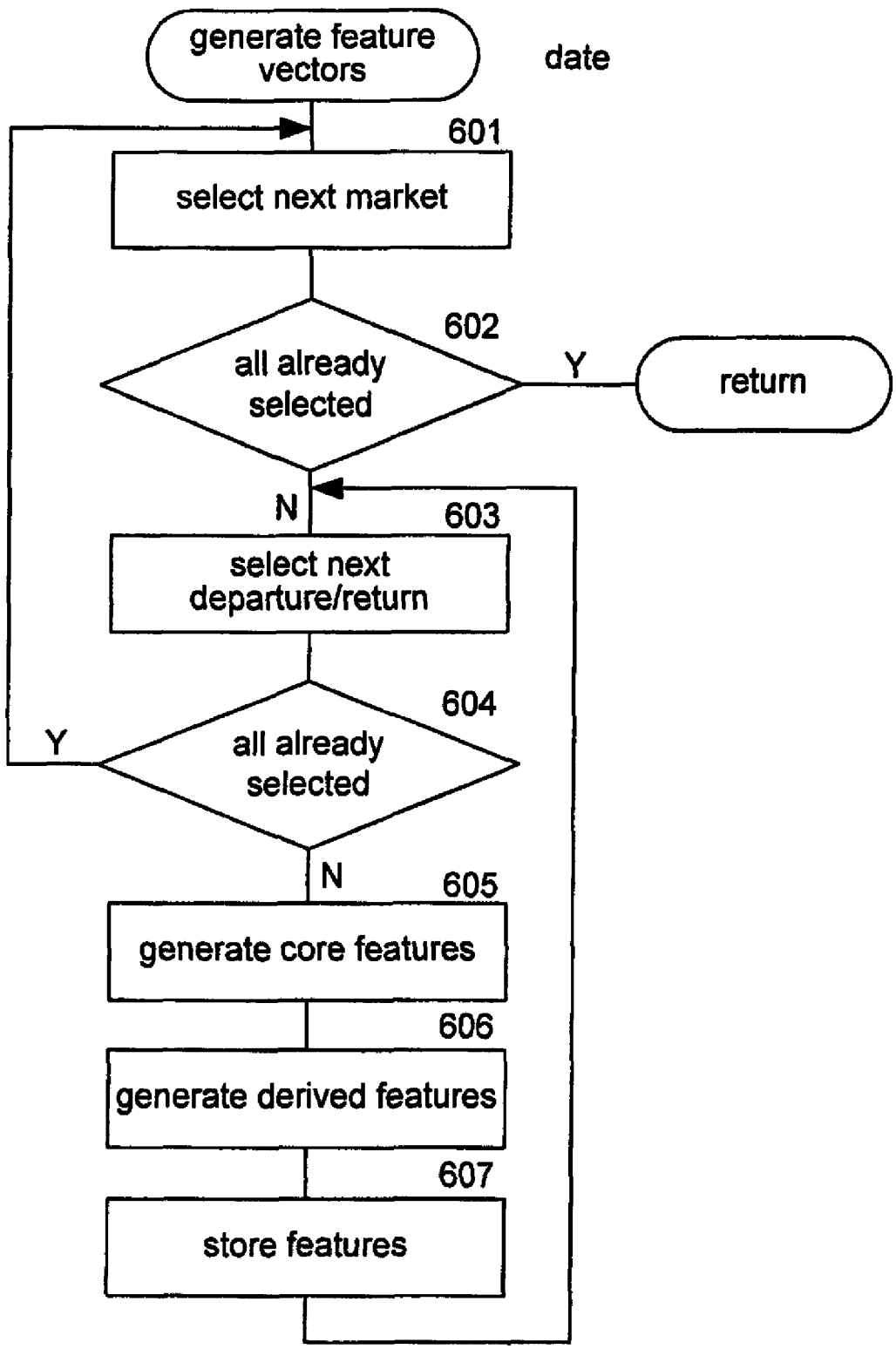
FIG. 6 is a flow diagram that illustrates the processing of the generate feature vectors component of the prediction system in one embodiment.

FIG. 6 is a flow diagram that illustrates the processing of the generate feature vectors component of the prediction system in one embodiment. The component is passed an observation date and generates feature vectors for the trips of that observation date. In block 601, the component selects the next market. In decision block 602, if all the markets have already been selected, then the component returns, else the component continues at block 603. In block 603, the component selects the next departure/return date. In decision block 604, if all the departure/return dates have already been selected, then the component loops to block 601 to select the next market, else the component continues at block 605. In block 605, the component generates the core features for the selected trip. In block 606, the component generates the derived features for the selected trip. In block 607, the component stores the generated features in the observation store and then loops to block 603 to select the next departure/return date.

Figure 7:
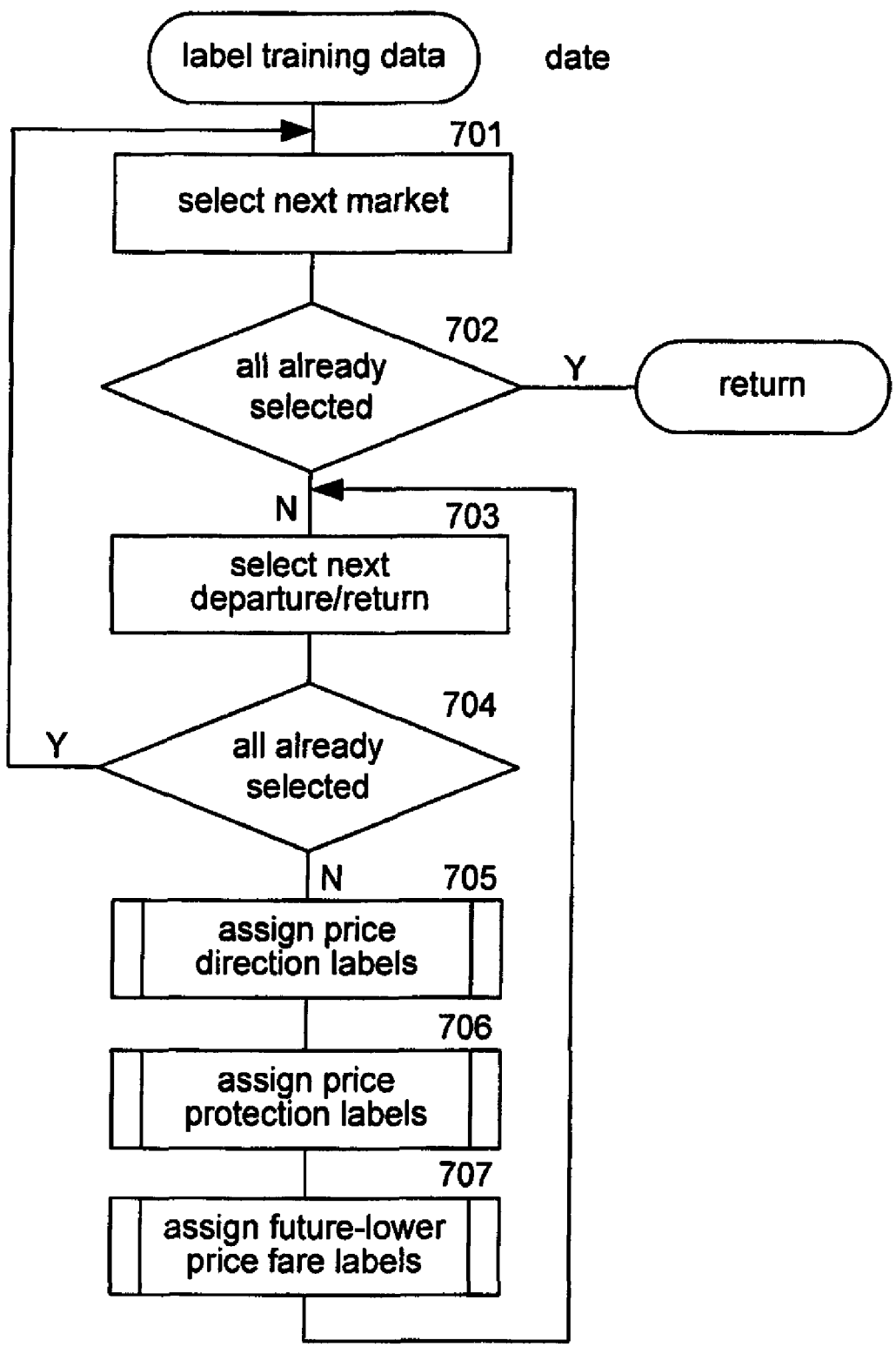
FIG. 7 is a flow diagram that illustrates the processing of the label training data component of the prediction system in one embodiment.

FIG. 7 is a flow diagram that illustrates the processing of the label training data component of the prediction system in one embodiment. The component is passed a date and labels the feature vectors for that observation date based on the feature vectors for the observation dates within the labeling window. In block 701, the component selects the next market. In decision block 702, if all the markets have already been selected, then the component returns, else the component continues at block 703. In block 703, the component selects the next departure/return date. In decision block 704, if all the departure/return dates for the selected market have already been selected, then the component loops to block 701 to select the next market, else the component continues at block 705. In block 705, the component invokes the assign price direction labels component to indicate actual price directions for the trip represented by the selected market and the selected departure/return date. In block 706, the component invokes the assign price protection labels component to indicate whether price protection should have been offered for the trip. In block 707, the component invokes the assign future-lower priced fare labels component to indicate whether future-lower priced fares should have been offered for the trip and then loops to block 703 to select the next departure/return date.

Figure 8:
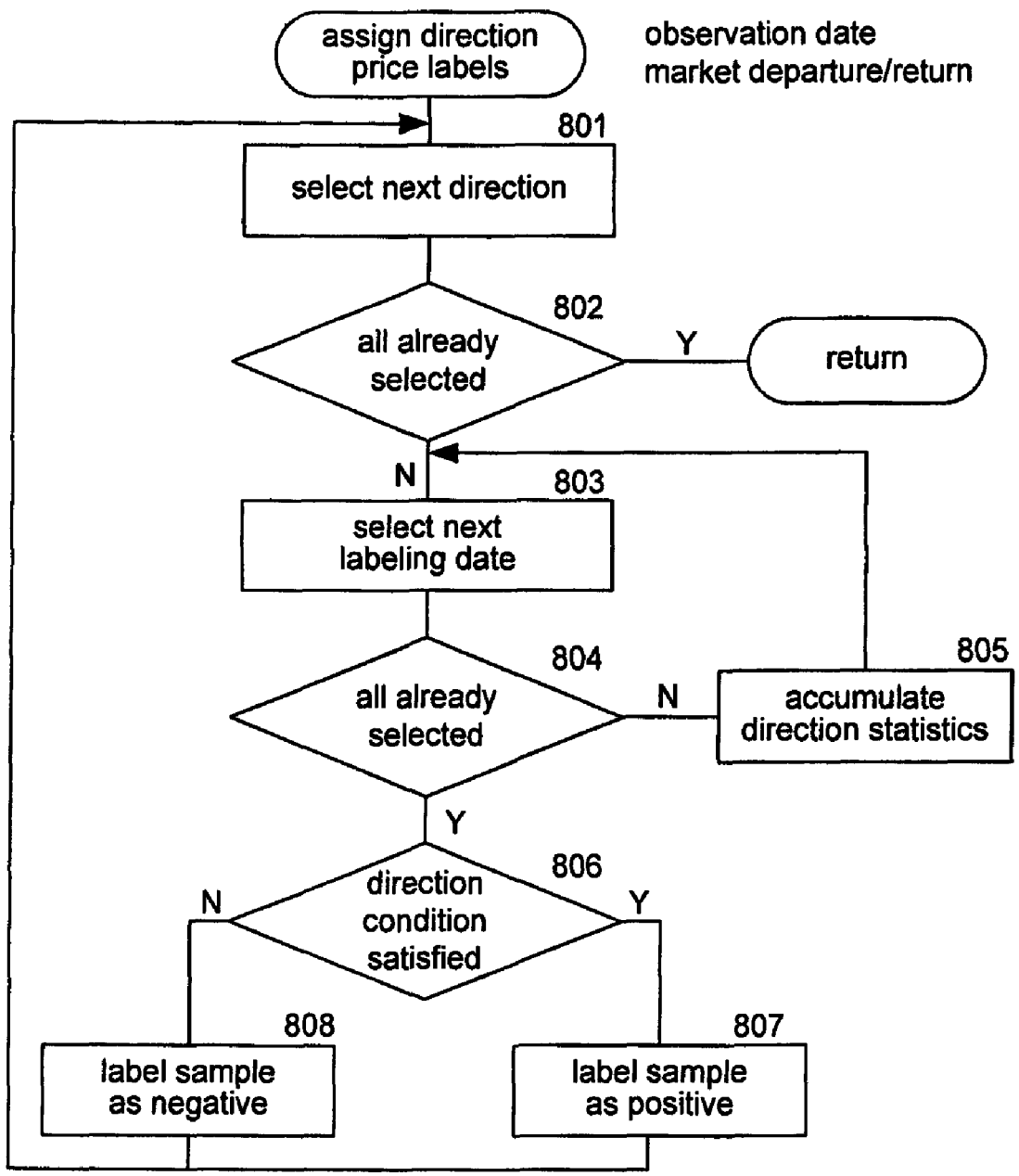
FIG. 8 is a flow diagram that illustrates the processing of the assign price direction labels component of the prediction system in one embodiment.

FIG. 8 is a flow diagram that illustrates the processing of the assign price direction labels component of the prediction system in one embodiment. The component is passed an observation date, a market, and a departure/return date specifying a specific trip at the observation date. The component assigns price direction labels to that trip. In block 801, the component selects the next direction (e.g., up and flat or up). In decision block 802, if all the directions have already been selected, then the component returns, else the component continues at block 803. In blocks 803-805, the component loops accumulating statistics for the trips in the labeling window. In block 803, the component selects the next labeling date. In decision block 804, if all the labeling dates have already been selected, then the component continues at block 806, else the component continues at block 805. In block 805, the component accumulates the direction statistics needed to calculate the selected direction and then loops to block 803 to select the next labeling date. In decision block 806, if the direction condition is satisfied, then the component continues at block 807 to label the trip as a positive sample, else the component continues at block 808 to label the trip as a negative sample. The component then loops to block 801 to select the next direction. In one embodiment, the conditions for determining whether the labeling window indicates a positive or a negative sample is represented by the following table.

| Direction | Condition |
| --- | --- |
| Up | At least one of the prices in the labeling window will be at least a certain amount higher than the current price, and no price will drop more than the certain amount from the current price |
| Flat or Up | A vast majority of the prices in the labeling window will be equal to or greater than the current price less a certain amount |
| Flat | A vast majority of the prices in the labeling window will be no lower than a certain amount and no higher than a certain amount from the current price |
| Flat or Down | A vast majority of the prices in the labeling window will be equal to or less than the current price plus a certain amount OR At least one of the prices in the labeling window will be at least a certain amount lower than the current price |
| Down | At least one of the prices in the labeling window will be at least a certain amount lower than the current price. |

Figure 9:
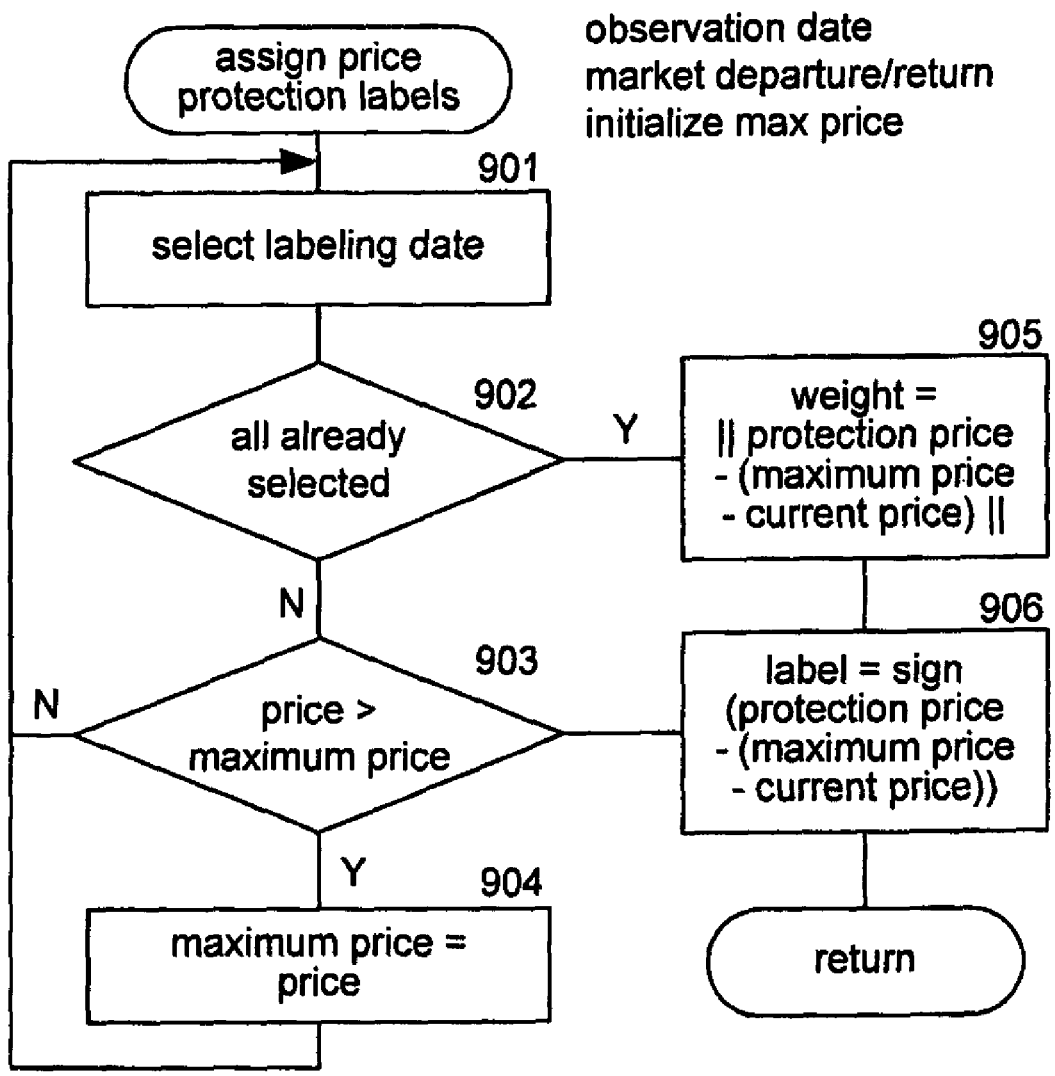
FIG. 9 is a flow diagram that illustrates the processing of the assign price protection labels component of the prediction system in one embodiment.

FIG. 9 is a flow diagram that illustrates the processing of the assign price protection labels component of the prediction system in one embodiment. The component is passed an observation date, a market, and a departure/return date that defines a trip at that observation date. The component then loops selecting each labeling date and collecting information to determine the label to generate for that trip. In block 901, the component selects the next labeling date of the labeling window. In decision block 902, if all the labeling dates have already been selected, then the component continues at block 905, else the component continues at block 903. In decision block 903, if the price of the ticket for the selected labeling date is greater than the maximum price encountered so far within the labeling window for that trip, then the component continues at block 904, else the component loops to block 901 to select the next label date. In block 904, the component sets a maximum price to the price of the selected labeling date and then loops to block 901 to select the next labeling date. In block 905, the component calculates a training weight for the trip as the absolute value of the protection price minus the difference between the maximum price and the current price. In block 906, the component sets the label to the sign of the protection price minus the difference between the maximum price and the current price. The component stores the label and the weight in the observation store and then returns.

Figure 10:
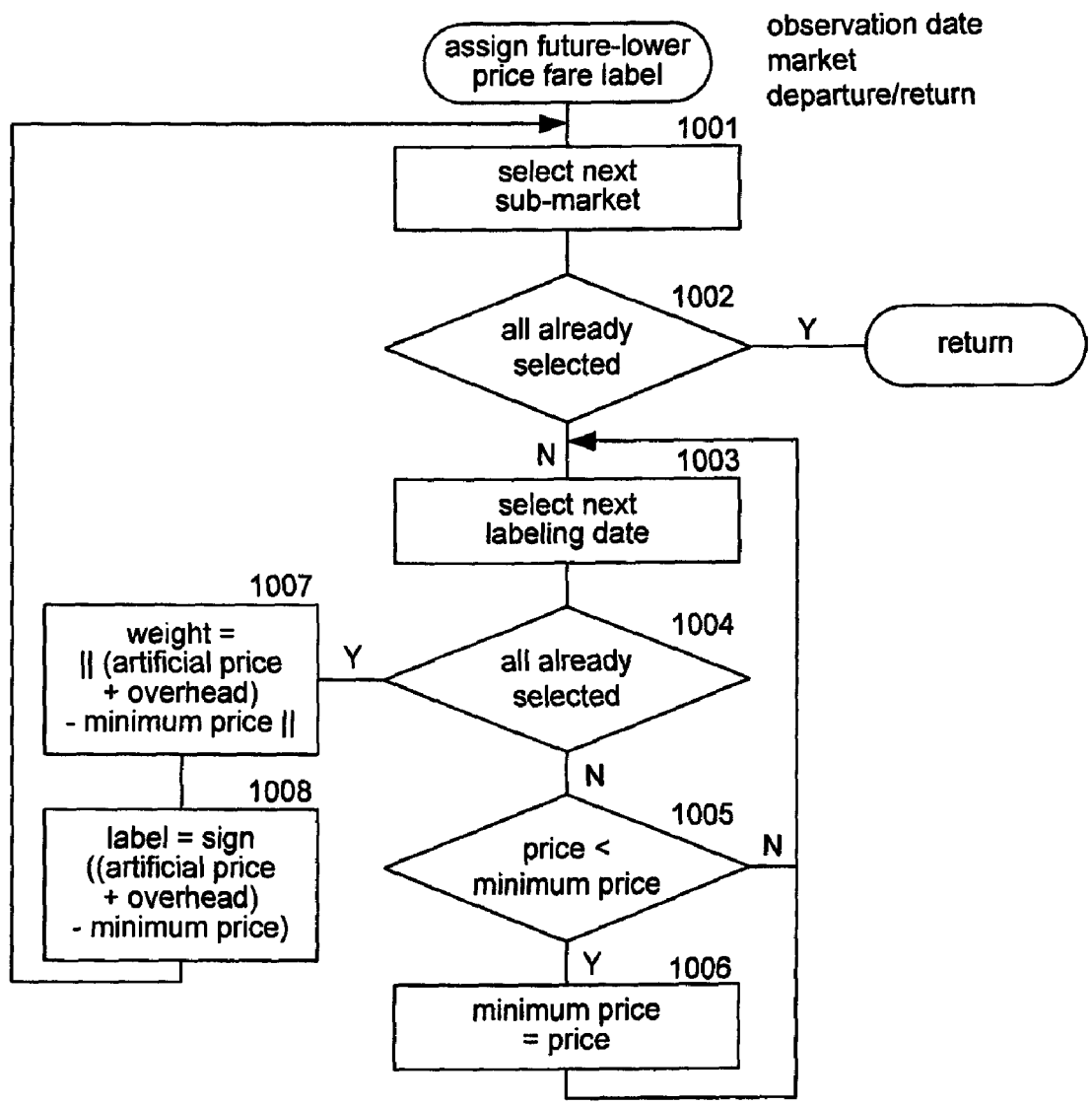
FIG. 10 is a flow diagram that illustrates the processing of the assign future-lower priced fare labels component of the prediction system in one embodiment.

FIG. 10 is a flow diagram that illustrates the processing of the assign future-lower priced fare labels component of the prediction system in one embodiment. The component is passed an observation date, a market, and a departure/return date identifying a particular trip at the observation date. The component determines whether the trip should be labeled to offer a future-lower priced fare. In block 1001, the component selects the next submarket of the trip. In decision block 1002, if all the submarkets have already been selected, then the component returns, else the component continues at block 1003. In block 1003, the component selects the next labeling date. In decision block 1004, if all the labeling dates have already been selected, then the component continues at block 1007, else the component continues at block 1005. In decision block 1005, if the price for the trip within the selected submarket at the selected labeling date is less than the minimum price encountered so far, then the component continues at block 1006, else the component loops to block 1003 to select the next labeling date. In block 1006, the component sets the minimum price to the selected price and then loops to block 1003 to select the next labeling date. In block 1007, the component sets the training weight for the training data for the submarket of the selected trip to the absolute value of the future-lower priced fare plus overhead minus the minimum price. In block 1008, the component sets the label for the training data to the sign of the artificial price plus overhead minus the minimum price. The component stores the training weight and the label in the observation store and then loops to block 1001 to select the next submarket.

Figure 11:
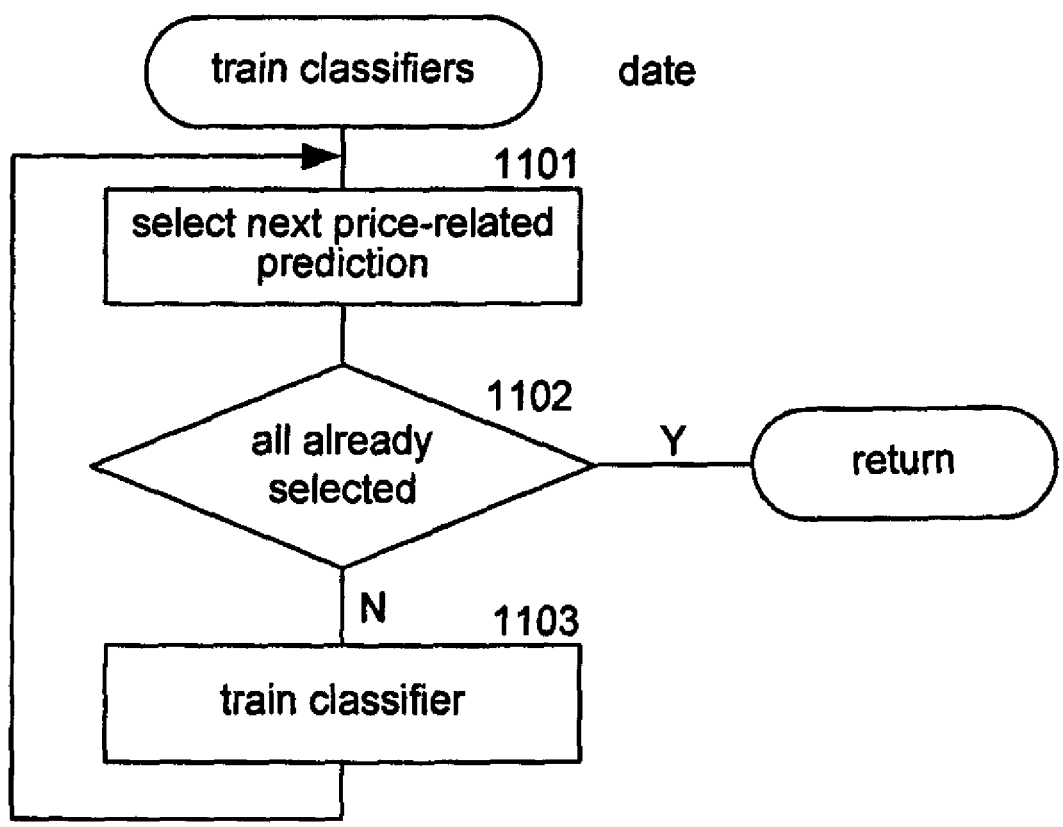
FIG. 11 is a flow diagram that illustrates the processing of the train classifiers component of the prediction system in one embodiment.

FIG. 11 is a flow diagram that illustrates the processing of the train classifiers component of the prediction system in one embodiment. The component is passed training data and trains the classifiers using training data as of the training date. In block 1101, the component selects the next price-related prediction. In decision block 1102, if all the price-related predictions have already been selected, then the component returns, else the component continues at block 1103. In block 1103, the component trains the classifier for the selected price-related prediction and then loops to block 1101 to select the next price-related prediction.

Figure 12:
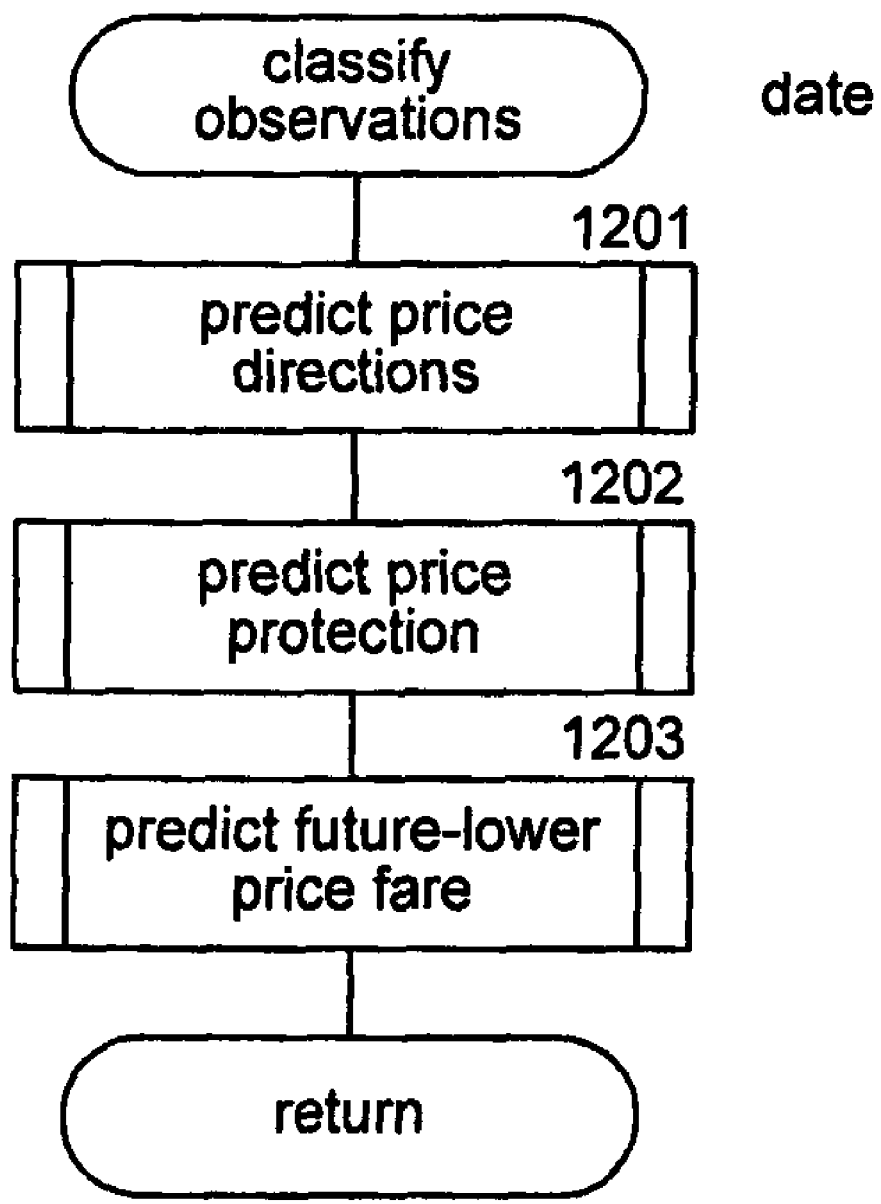
FIG. 12 is a flow diagram that illustrates the processing of the classify observations component of the prediction system in one embodiment.

FIG. 12 is a flow diagram that illustrates the processing of the classify observations component of the prediction system in one embodiment. The component is passed an observation date and classifies observations for that observation date based on the currently trained classifiers. In block 1201, the component invokes the predict price directions component to predict directions for the trips for the observation date. In block 1202, the component invokes the predict price protection component to determine whether to offer price protection for the trips on the observation date. In block 1203, the component invokes the predict future-lower priced fare component to determine whether to offer future-lower priced fares for the submarkets of the trips on the observation date.

Figure 13:
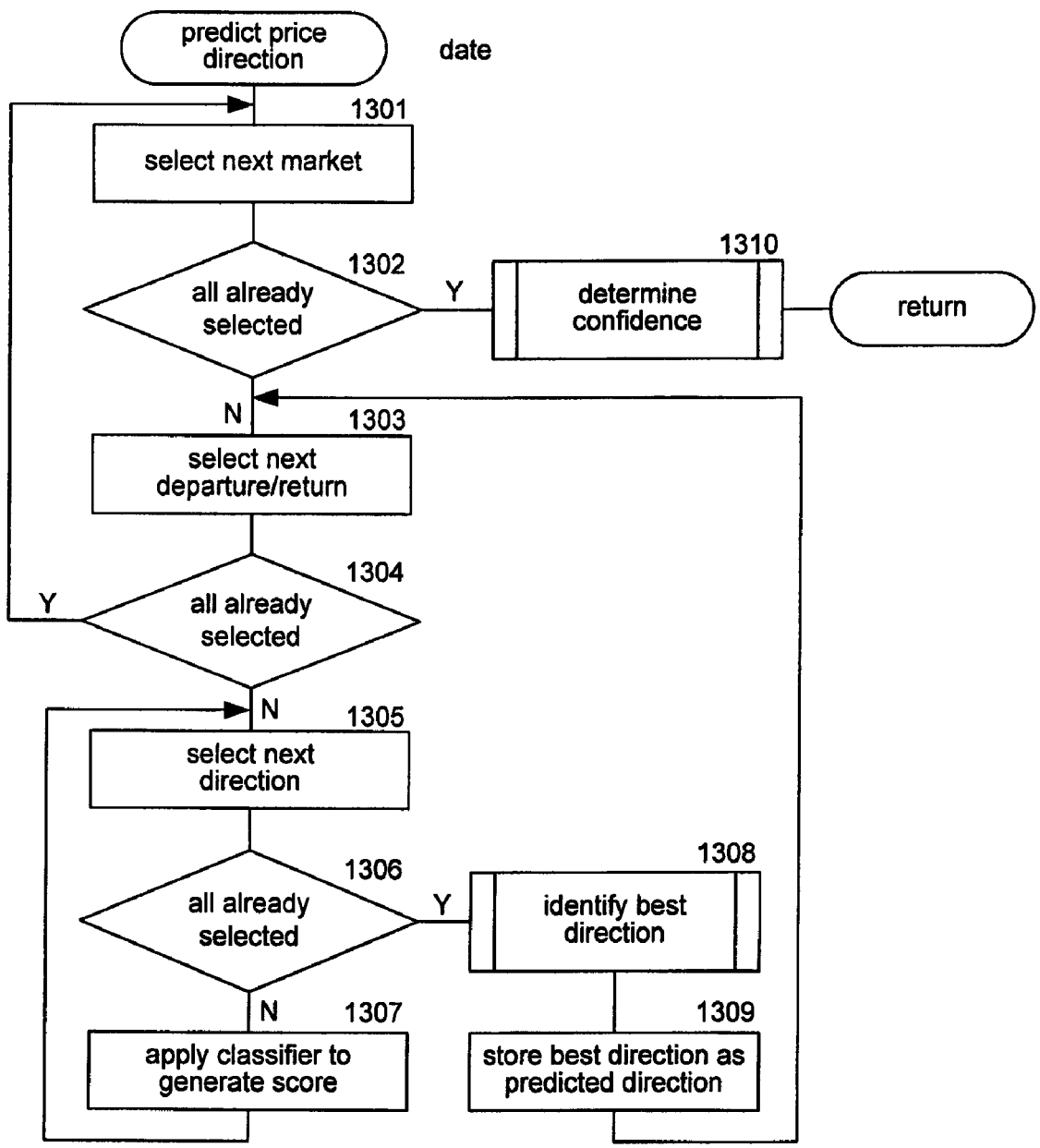
FIG. 13 is a flow diagram that illustrates the processing of the predict price directions component of the prediction system in one embodiment.

FIG. 13 is a flow diagram that illustrates the processing of the predict price directions component of the prediction system in one embodiment. The component is passed an observation date and determines price directions for the trips of that observation date. In block 1301, the component selects the next market. In decision block 1302, if all the markets have already been selected, then the component continues at block 1310, else the component continues at block 1303. In block 1303, the component selects the next departure/return date combination. In decision block 1304, if all the departure/return dates for the selected market have already been selected, then the components loops to block 1301 to select the next market, else the component continues at block 1305. In block 1305, the component selects the next price direction. In decision block 1306, if all the price directions have already been selected, then the component continues at block 1308, else the component continues at block 1307. In block 1307, the component applies the classifier to generate a score indicating the likelihood of the ticket price changing in the selected direction. The component then loops to block 1305 to select the next direction. In block 1308, the component invokes an identify best direction component to identify the price direction that is best to provide as the predicted price direction. In block 1309, the component stores the best direction as the predicted direction for the trip represented by the selected market and the selected departure/return date. The component then loops to block 1303 to select the next departure/return date for the selected market. In block 1310, the component determines the confidence of the selected price direction and then returns.

Figure 14:
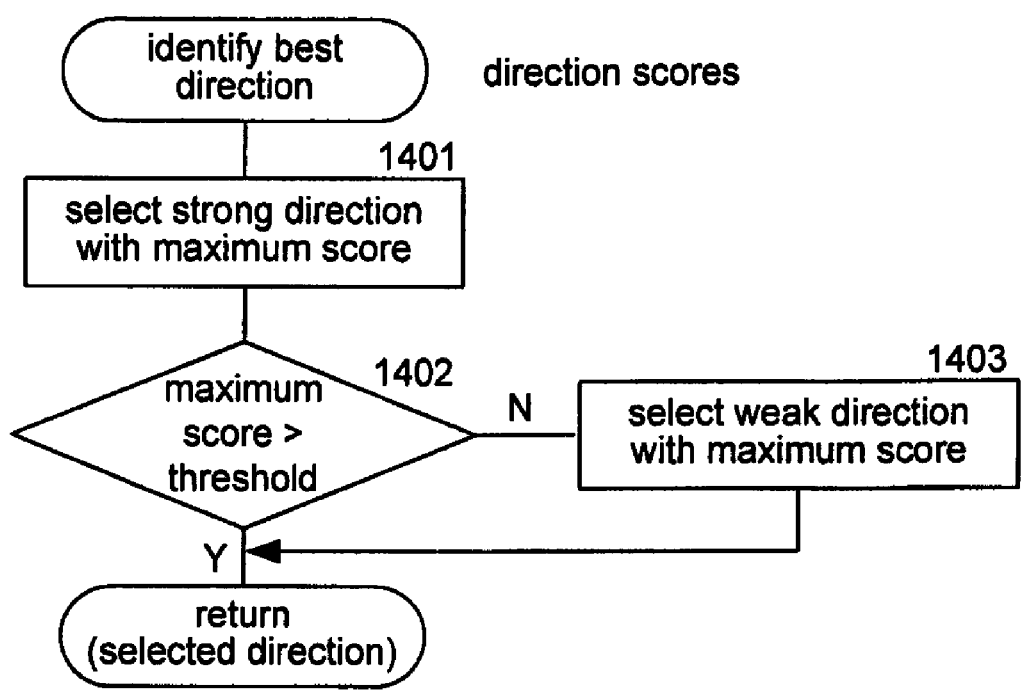
FIG. 14 is a flow diagram that illustrates the processing of the identify best direction component of the prediction system in one embodiment.

FIG. 14 is a flow diagram that illustrates the processing of the identify best direction component of the prediction system in one embodiment. The component is passed direction scores and selects the best direction. In block 1401, the component selects the strong direction with the highest score. In decision block 1402, if the highest score exceeds the threshold amount by more than the other scores of the strong directions, then the component returns the selected direction, else the component continues at block 1403. In block 1403, the component selects the weak direction with the highest score and then returns the selected direction.

Figure 15:
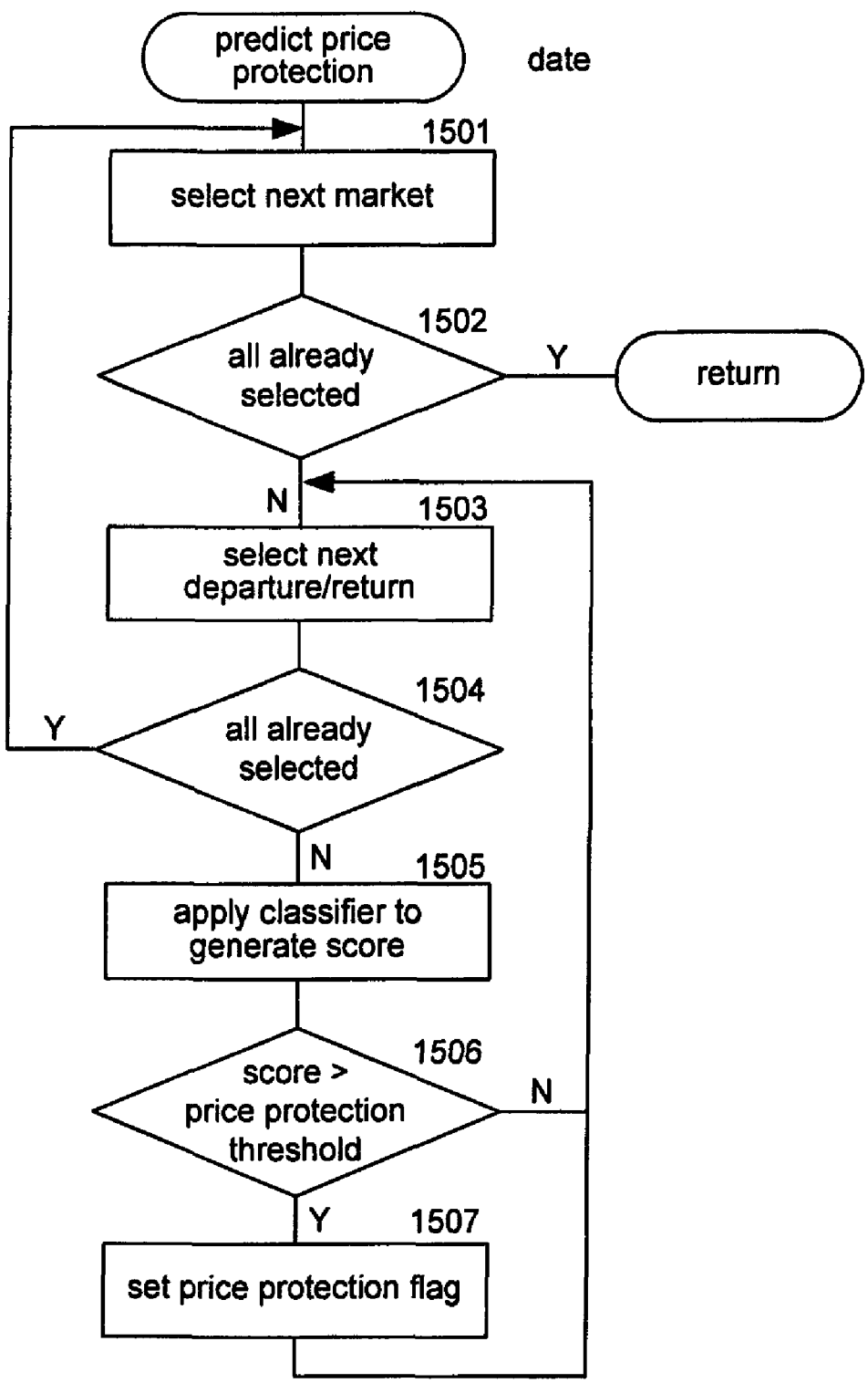
FIG. 15 is a flow diagram that illustrates the processing of the predict price protection component of the prediction system in one embodiment.

FIG. 15 is a flow diagram that illustrates the processing of the predict price protection component of the prediction system in one embodiment. The component is passed an observation date and determines whether price protection should be offered for the trips observed on that observation date. In block 1501, the component selects the next market for the observation date. In block 1502, if all the markets have already been selected, then the component returns, else the component continues at block 1503. In block 1503, the component selects the next departure/return date combination for the selected market. In decision block 1504, if all the departure/return dates have already been selected, then the component loops to block 1501 to select the next market, else the component continues at block 1505. In block 1505, the component applies the classifier to generate a score indicating whether the trip represented by the selected market and departure/return date should have price protection offered. In decision block 1506, if the score is greater than a price protection threshold, then the component continues at block 1507, else the component loops to block 1503 to select the next departure/return date for the selected market. In block 1507, the component sets the price protection flag for the trip represented by the selected market and the selected departure/return date and then loops to block 1503 to select the next departure/return date.

Figure 16:
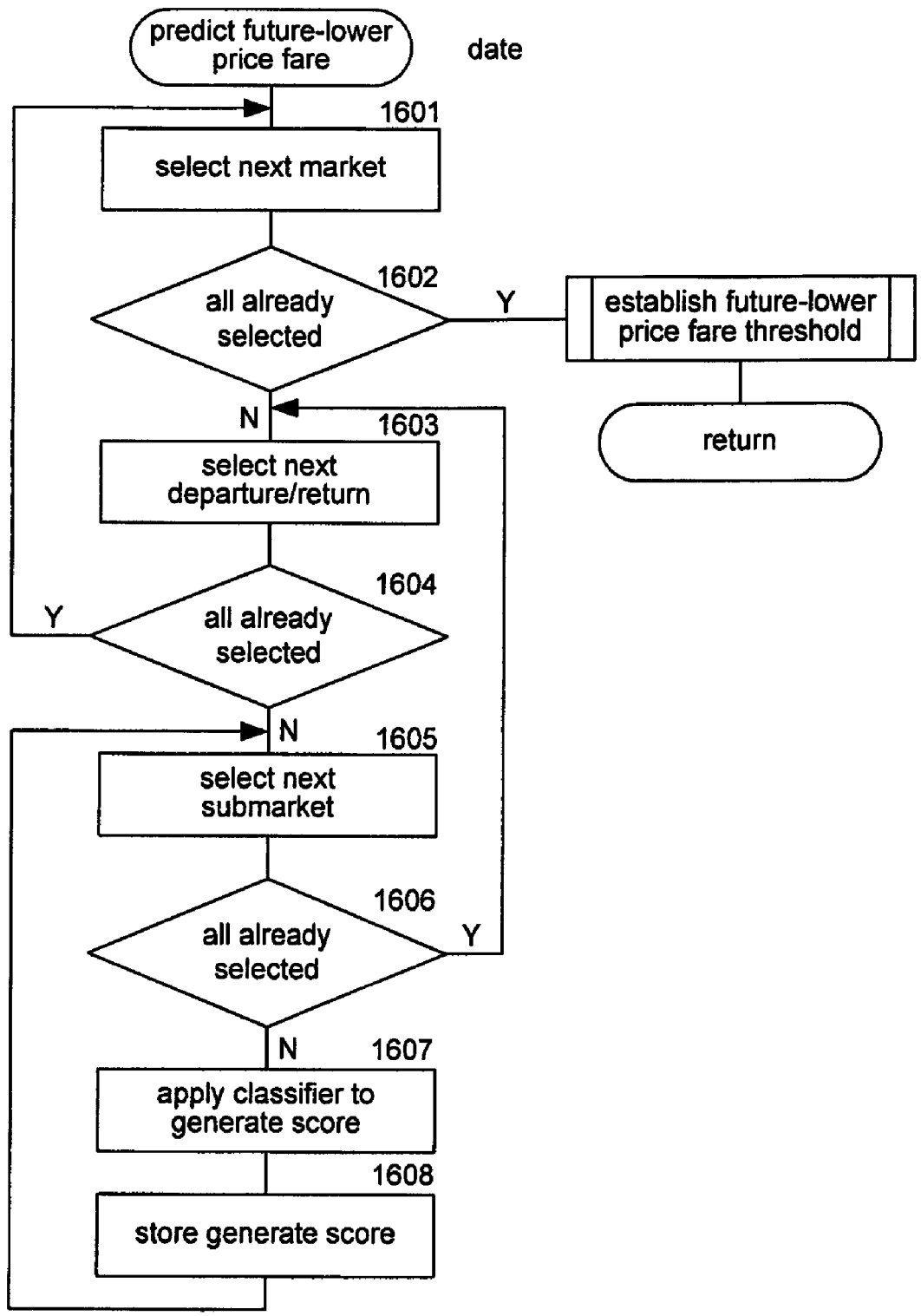
FIG. 16 is a flow diagram that illustrates the processing of the predict future-lower priced fare component of the prediction system in one embodiment.

FIG. 16 is a flow diagram that illustrates the processing of the predict future-lower priced fare component of the prediction system in one embodiment. The component is passed an observation date and generates a score for each trip observed on the passed observation date indicating whether a future-lower priced fare should be offered for that trip. The component also establishes a future-lower priced fare threshold for which the prediction system will offer a future-lower priced fare for trips whose generated scores are above the future-lower priced fare threshold. In block 1601, the component selects the next market. In decision block 1602, if all the markets have already been selected, then the component continues at block 1609, else the component continues at block 1603. In block 1603, the component selects the next departure/return date for the selected market. In decision block 1604, if all departure/return dates have already been selected, then the component loops to block 1601 to select the next market, else the component continues at block 1605. In block 1605, the component selects the next submarket for the selected market and selected departure/return date combination. In decision block 1606, if all such submarkets have already been selected, then the component looks to block 1603 to select the next departure/return date, else the component continues at block 1607. In block 1607, the component applies a classifier to generate a score indicating whether a future-lower priced fare should be offered. In block 1608, the component stores the generated score in association with the selected market, departure/return date combination, and submarket. The component then loops to block 1605 to select the next submarket. In block 1609, the component invokes a component to establish the future-lower priced fare threshold for scores above which future-lower priced fares may be offered.

Figure 17:
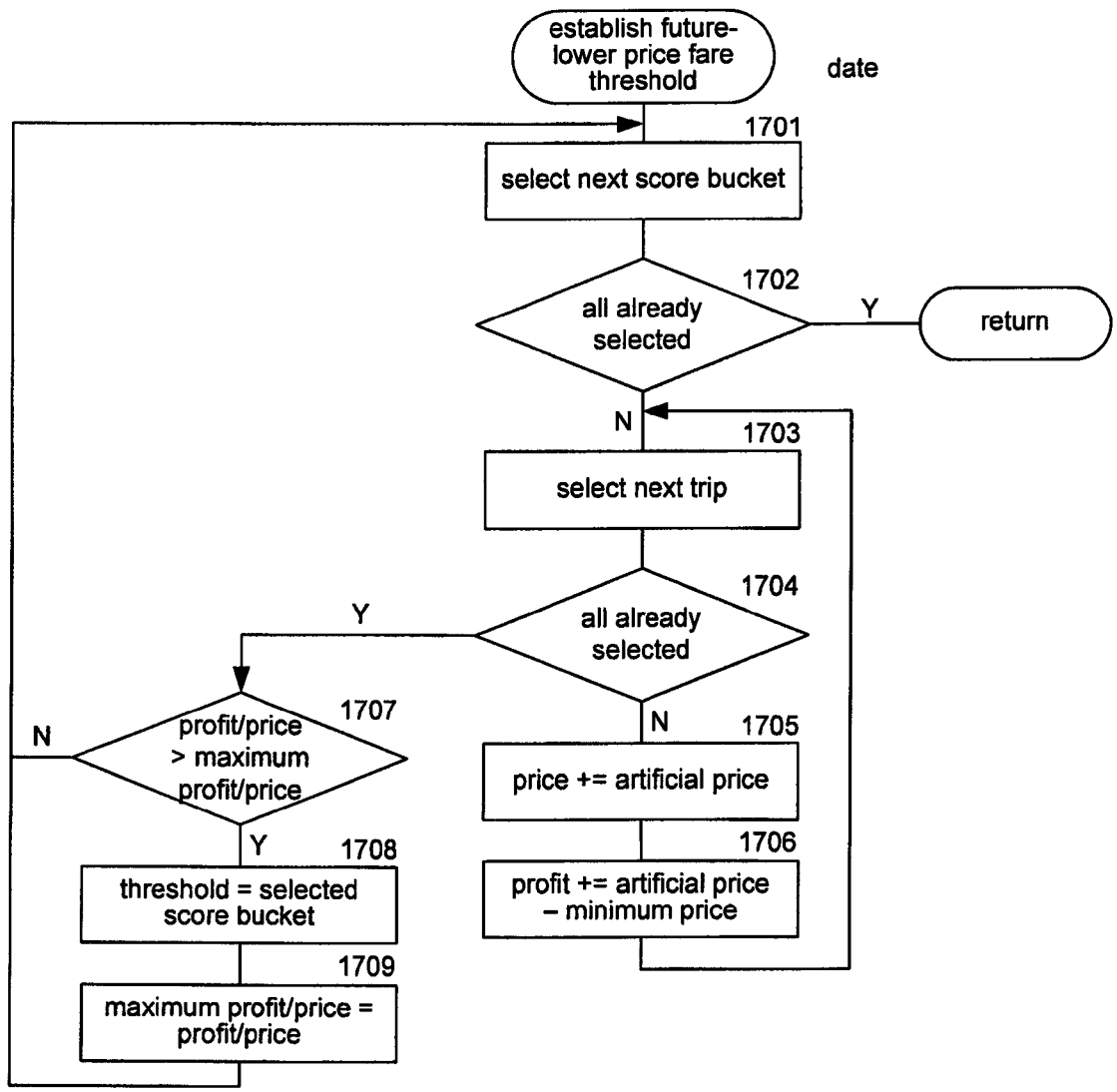
FIG. 17 is a flow diagram that illustrates the processing of the establish future-lower priced fare threshold component of the prediction system in one embodiment.

FIG. 17 is a flow diagram that illustrates the processing of the establish future-lower priced fare threshold component of the prediction system in one embodiment. The component is passed a date and establishes a future-lower priced fare threshold indicating a minimum score for which future-lower priced fares may be offered. The component selects as the future-lower priced fare threshold a score in which the percentage of profit will be maximized. The component quantizes or bucketizes the scores. For example, if the scores range from +1 to −1, the component may select a bucket size of 0.1. In block 1701, the component selects the next bucket starting with the bucket having the highest score. In decision block 1702, if all the buckets have already been selected, then the component returns, else the component continues at block 1703. In block 1703, the component selects the next trip with an artificial score within the selected bucket. In decision block 1704, if all such trips have already been selected, then the component continues at block 1707, else the component continues at block 1705. In block 1705, the component increments the total price by the future-lower priced fare for the selected trip. In block 1706, the component increments the total profit by the difference between the future-lower priced fare and the current price of the trip. The component then loops to block 1703 to select the next trip for the selected bucket. In decision block 1707, if the total profit divided by the total price is greater than the maximum profit divided by price encountered so far, then the component continues at block 1708, else the component loops to block 1701 to select the next bucket. In block 1708, the component sets the threshold to the score of the selected bucket. In block 1709, the component sets the maximum profit divided by price equal to the total profit divided by the total price and loops to block 1701 to select the next bucket.

Figure 18:
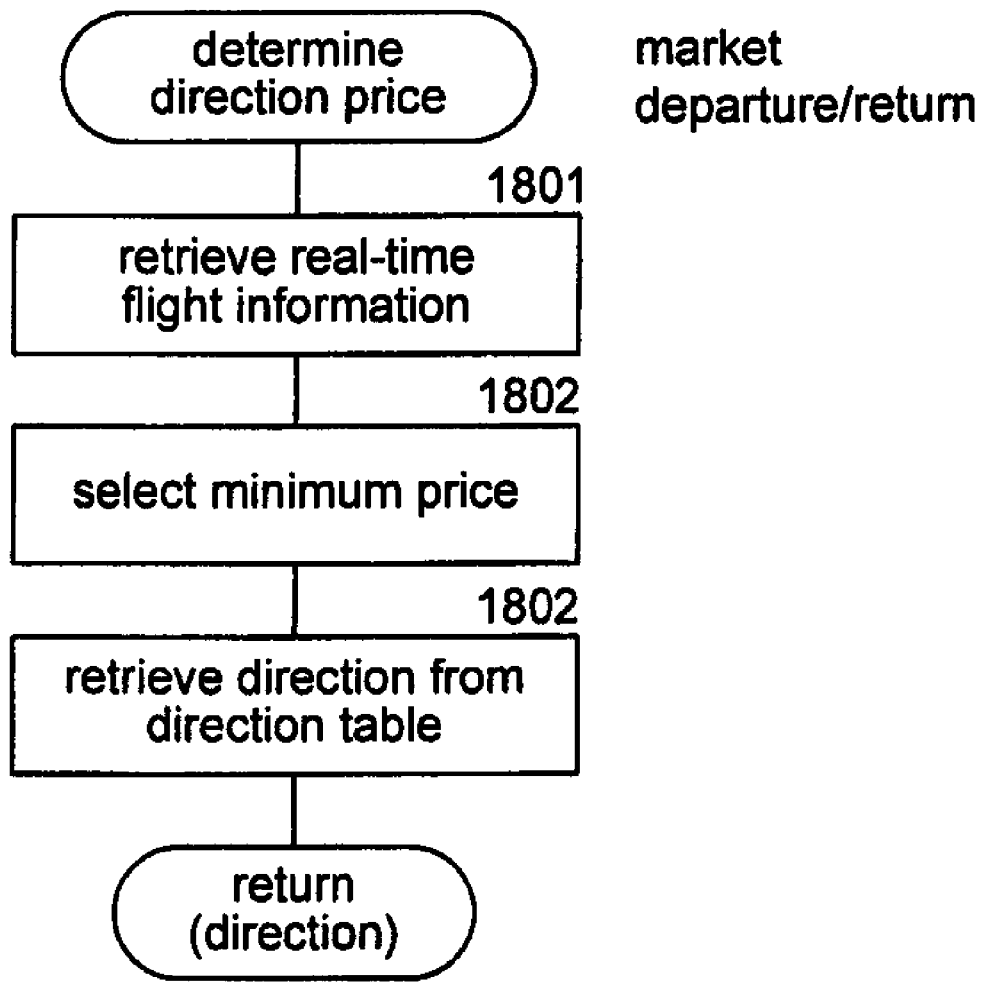
FIG. 18 is a flow diagram that illustrates the processing of the determine price direction component of the prediction system in one embodiment.

FIG. 18 is a flow diagram that illustrates the processing of the determine price direction component of the prediction system in one embodiment. The component is passed a market and a departure/return date representing a trip. The component determines the price direction from the price direction predictions generated during the batch processing. In block 1801, the component retrieves real-time flight information for the passed trip from the flight information source. In block 1802, the component selects the minimum price of the real-time flight information. In block 1803, the component retrieves the price direction from the direction table based on the predicted ticket price that is closest to the minimum price. The component then returns that direction.

Figure 19:
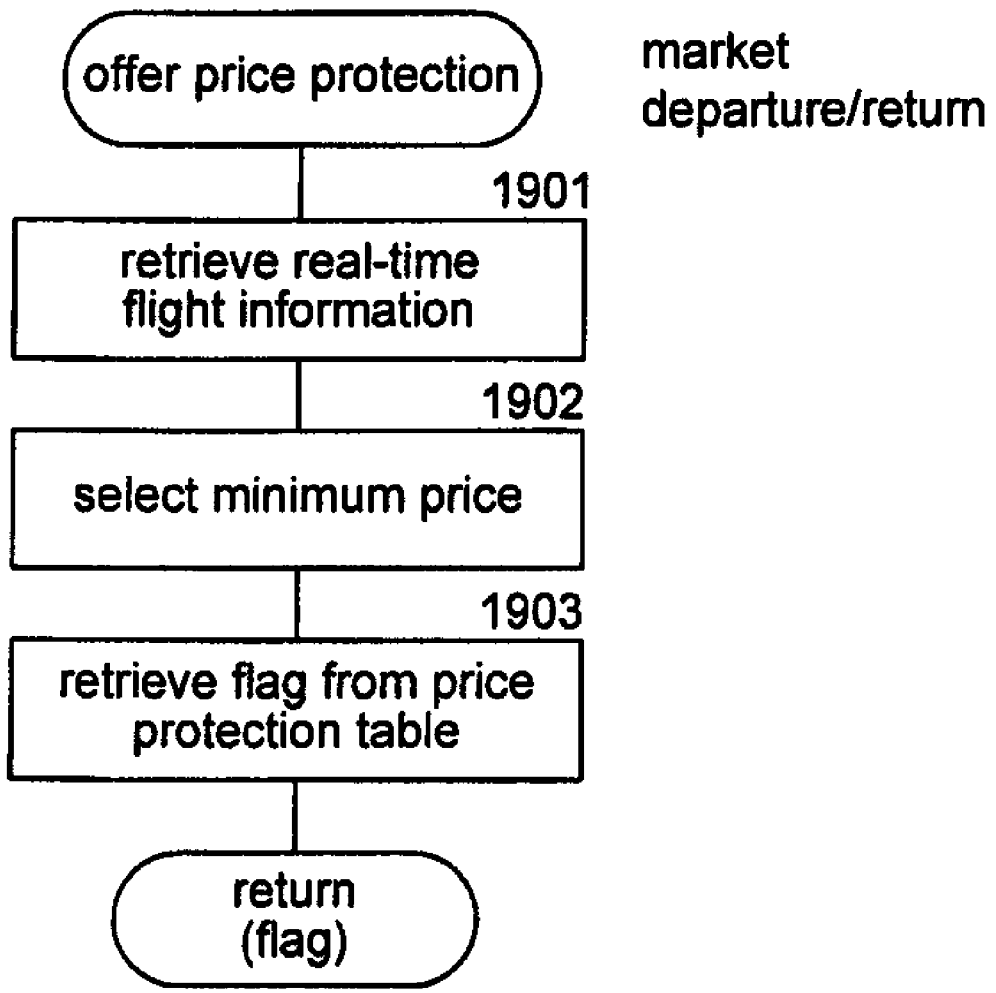
FIG. 19 is a flow diagram that illustrates the processing of the offer price protection component of the prediction system in one embodiment.

FIG. 19 is a flow diagram that illustrates the processing of the offer price protection component of the prediction system in one embodiment. The component is passed a market and a departure/return date representing the trip. The component determines whether to offer price protection for the trip. In block 1901, the component retrieves real-time flight information for the trip from the flight information source. In block 1902, the component selects the minimum price of the flight information. In block 1903, the component retrieves a flag from the price protection table for a predicted price that is closest to the selected minimum price. The component then returns the flag.

Figure 20:
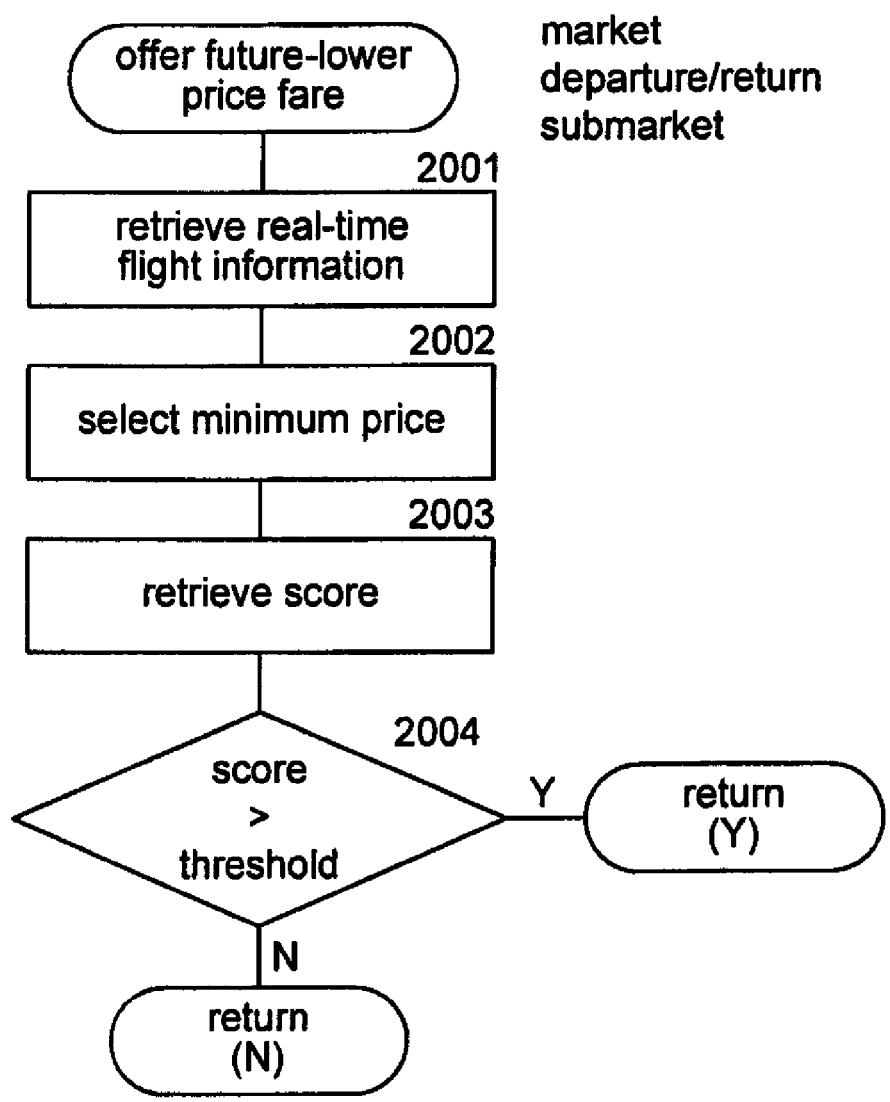
FIG. 20 is a flow diagram that illustrates the processing of the offer future-lower priced fare component of the prediction system in one embodiment.

FIG. 20 is a flow diagram that illustrates the processing of the offer future-lower priced fare component of the prediction system in one embodiment. The component is passed a market, a departure/return date, and a submarket representing a trip within a submarket. The component determines whether to offer a future-lower priced fare for this submarket based on the batch predictions. In block 2001, the component retrieves real-time flight information for the submarket of the passed trip from the flight information source. In block 2002, the component selects the minimum price within the flight information. In block 2003, the component retrieves the score from the future-lower priced fare table for the predicted price closest to the selected minimum price. In decision block 2004, if the score is greater than the threshold for offering future-lower priced fares, then the component returns a yes indication, else the component returns a no indication.

From the foregoing, it will be appreciated that specific embodiments of the invention have been described herein for purposes of illustration, but that various modifications may be made without deviating from the spirit and scope of the invention. For example, one skilled in the art will appreciate that a trip could alternately be defined as being one way. In such a case, a trip would be a unique combination of a departure and arrival location and departure date. Also, a trip may include an arrival location that is separate from the return location. For example, a trip could have a departure location of Seattle, an arrival location of Boston, and a return location of New York City when a person flies from Seattle to Boston and on return flies from New York City to Seattle. A trip may also encompass more than two flights. For example, a person may fly from Seattle to Boston, Boston to Atlanta, and then from Atlanta to Seattle. A trip may also include a specific submarket or a specific flight. One skilled in the art will appreciate that the prediction system can be used to make predictions on a non-travel related item. For example, the prediction system may be adapted to make predictions for automobile prices, prices of commodities (e.g., oil and gas), prices for stocks, and so on. Accordingly, the invention is not limited except as by the appended claims.

We claim:

1. A method performed by a computing device with a processor and memory for providing a trip comparison user interface for flight information, the method comprising:

providing a data store storing trip overview information having data elements that include flight identification information, total duration, total distance, number of stops, on-time information, and seats remaining information; flight details information having data elements that include flight identification information, aircraft model, aircraft type, aircraft dimensions, and seat information; airport details information having data elements that include flight identification information, car rental information, security wait times, and airport amenities; and airline details information having data elements that include flight identification information, number of airplanes of the airline, market share of the airlines, average aircraft age, on-time ranking, and complaint ranking;

displaying a trip overview information button, a trip comparison information button, an airport details information button, and an airline details information button;

receiving from a user an indication of trip, the trip including an outbound flight leaving from a outbound airport and a return flight leaving from a return airport;

receiving from the user a selection of one of the displayed buttons to indicate the type of trip comparison information to be displayed;

determining whether the type of trip comparison information indicates trip overview information;

upon determining that the type of trip comparison information indicates trip overview information,
retrieving trip overview information from the data store; and
generating by the computing device a trip overview display page that includes the retrieved trip overview information for the outbound flight and the inbound flight, the retrieved trip overview information having data elements that include flight identification information, total duration, total distance, number of stops, on-time information, and seats remaining information;

determining whether the type of trip comparison information indicates flight details information;

upon determining that the type of trip comparison information indicates flight details information,
retrieving flight details information from the data store; and
generating by the computing device a flight details display page that includes the retrieved flight details information for the outbound flight and the inbound flight, the retrieved flight details information having data elements that include flight identification information, aircraft model, aircraft type, aircraft dimensions, and seat information;

determining whether the type of trip comparison information indicates airport details information;

upon determining that the type of trip comparison information indicates airport details information,
retrieving airport details information from the data store; and
generating by the computing device an airport details display page that includes the retrieved airport details information for the outbound flight and the inbound flight, the retrieved airport details information having data elements that include flight identification information, car rental information, security wait times, and airport amenities;

determining whether the type of trip comparison information indicates airline details information;

upon determining that the type of trip comparison information indicates airline details information,
retrieving airline details information from the data store; and
generating by the computing device an airline details display page that includes the retrieved airline details information for the outbound flight and the inbound flight, the retrieved airline details information having data elements that include flight identification information, number of airplanes of the airline, market share of the airlines, average aircraft age, on-time ranking, and complaint ranking;

such that, for each display page, the data elements of the inbound flight are aligned vertically and the data elements of the outbound flight are aligned vertically, each data element of the outbound flight being aligned horizontally with a corresponding data element of the inbound flight; and outputting the generated display page for display to the user.

2. The method of claim 1 wherein each display page includes an icon representing a score for a data element.

3. The method of claim 2 wherein the icon representing a score indicates a favorable data element, neutral data element, or an unfavorable data element.

4. The method of claim 1 wherein each generated display page includes a "buy now" button for purchasing tickets for the outbound flight and the return flight.

5. The method of claim 1 wherein each display page includes the price of the trip represented by the outbound flight and the return flight.

6. The method of claim 1 wherein the computing device is a web server and the display page is a web page.

7. The method of claim 1 wherein the aircraft dimensions include aircraft width and aircraft length.

8. The method of claim 1 wherein the seat information includes seat layout and seat pitch.

9. A computer for providing a trip comparison user interface for flight information, comprising:

a memory storing computer-executable instructions of:

a component that receives from a user an indication of trip and a type of trip comparison information, the trip including an outbound flight leaving from a outbound airport and a return flight leaving from a return airport;

a component that determines whether the type of trip comparison information indicates trip overview information, flight details information, airport details information, and airport details information;

a component that, upon determining that the type of trip comparison information indicates trip overview information, generates a trip overview display page that includes trip overview information for the outbound flight and the inbound flight, the trip overview information having data elements selected from the group consisting of flight identification information, total duration, total distance, number of stops, on-time information, and seats remaining information;

a component that, upon determining that the type of trip comparison information indicates flight details information, generates a flight details display page that includes flight details information for the outbound flight and the inbound flight, the flight details information having data elements selected from the group consisting of flight identification information, aircraft model, aircraft type, aircraft dimensions, and seat information;

a component that, upon determining that the type of trip comparison information indicates airport details information, generates an airport details display page that includes airport details information for the outbound flight and the inbound flight, the airport details information having data elements selected from the group consisting of flight identification information, car rental information, security wait times, and airport amenities;

a component that, upon determining that the type of trip comparison information indicates airline details information, generates an airline details display page that includes airline details information for the outbound flight and the inbound flight, the airline details information having data elements selected from the group consisting of flight identification information, number of airplanes of the airline, market share of the airlines, average aircraft age, on-time ranking, and complaint ranking;

such that, for each display page, the data elements of the inbound flight are aligned vertically and the data elements of the outbound flight are aligned vertically, each data element of the outbound flight being aligned horizontally with a corresponding data element of the inbound flight; and a component that sends the generated display page for display to the user; and a processor for executing the computer-executable instructions stored in the memory.

10. The computer of claim 9 wherein each display page includes an icon representing a score for a data element.

11. The computer of claim 10 wherein the icon representing a score indicates a favorable data element, neutral data element, or an unfavorable data element.

12. The computer of claim 9 wherein each generated display page includes a "buy now" button for purchasing tickets for the outbound flight and the return flight.

13. The computer of claim 9 wherein each display page includes the price of the trip represented by the outbound flight and the return flight.

14. The computer of claim 9 wherein the display page is a web page.

15. The computer of claim 9 wherein the aircraft dimensions include aircraft width and aircraft length.

16. The computer of claim 9 wherein the seat information includes seat layout and seat pitch.

\* \* \* \* \*